Figure 1:
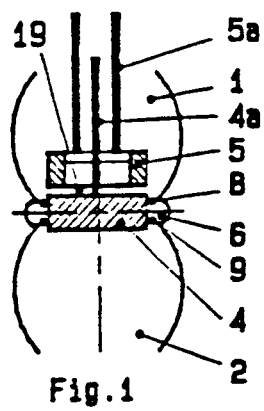
Figure 2:
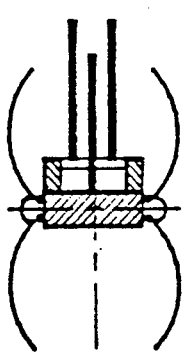
Figure 3:
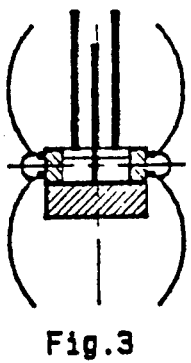

United States Patent [19]

Mieth

[11] Patent Number: 5,085,241
[45] Date of Patent: Feb. 4, 1992

[54] PROCESS FOR CONTROLLING A LEAKAGE CAVITY OF A VALVE AND AN APPARATUS THEREFOR

[76] Inventor: Hans O. Mieth, Sandkrug 3, D-2058 Schnakenbek, Fed. Rep. of Germany

[21] Appl. No.: 252,364
[22] PCT Filed: Jan. 15, 1988
[86] PCT No.: PCT/EP88/00027
    § 371 Date: Sep. 2, 1988
    § 102(e) Date: Sep. 2, 1988
[87] PCT Pub. No.: WO88/05512
    PCT Pub. Date: Jul. 28, 1988

[30] Foreign Application Priority Data

Jan. 16, 1987 [DE] Fed. Rep. of Germany ....... 3701027

[51] Int. Cl.$^5$ .................. F16K 11/20; F16K 51/00; B08B 9/00
[52] U.S. Cl. .................................... 137/1; 137/240; 137/312; 137/614.17; 137/614.18; 137/614.19; 134/166 C
[58] Field of Search .............. 137/238, 240, 614.17, 137/614.18, 614.19, 1, 312; 134/166 C, 167 C, 168 C, 169 C

[56] References Cited

U.S. PATENT DOCUMENTS

| | | | |
|---|---|---|---|
| 4,304,251 | 12/1981 | Schädel et al. | 137/240 |
| 4,368,753 | 1/1983 | Brakelmann et al. | 137/240 |
| 4,373,545 | 2/1983 | Knappe | 137/240 |
| 4,436,106 | 3/1984 | Tuchenhagen et al. | 137/240 |
| 4,522,223 | 6/1985 | Balsys et al. | 137/614.18 |
| 4,617,955 | 10/1986 | Melgaard | 137/240 |
| 4,655,253 | 4/1987 | Ourensma | 137/240 |
| 4,687,015 | 8/1987 | Mieth | 137/240 |
| 4,856,551 | 8/1989 | Brakelmann | 137/240 |

Primary Examiner—George L. Walton
Attorney, Agent, or Firm—Lane, Aitken & McCann

[57] ABSTRACT

A valve which is fitted with two sealing places which are disposed in series and in the closed position of the valve prevent the overflow of fluid from one valve casing part into another, with the leakage cavity disposed between the sealing places and connected to the outside of the valve through the valve casing, has a closed position in which the connection of the leakage cavity with an inside space of the valve casing parts is sealed by a closing member cooperating with the two sealing places.

The connection between the leakage cavity and the inside space can be controlled also in positions other than the closed position of the valve by a locking piece which substitutes the closing member regarding its interaction with the leakage cavity. This locking piece, which is movable relative to the closing member in the direction of the degree of freedom of motion of the closing member, controls the connection between the leakage cavity and the inside space.

63 Claims, 24 Drawing Sheets

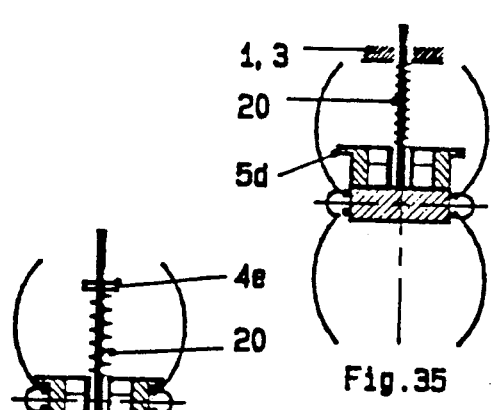
1,3
20
5d
Fig.35 Fig.36 Fig.37
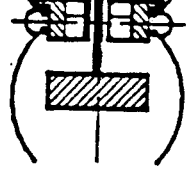
4e
20
Fig.47
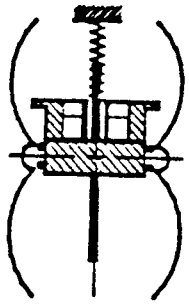 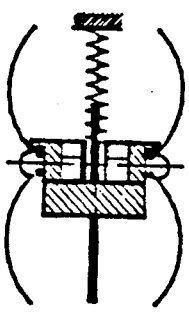 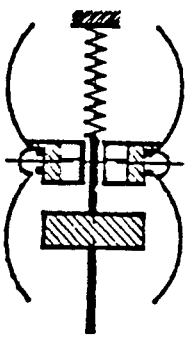
Fig.38 Fig.39 Fig.40
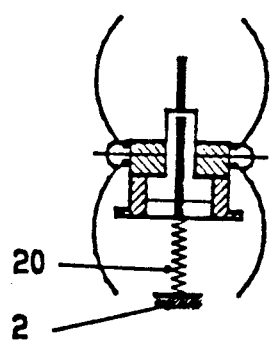 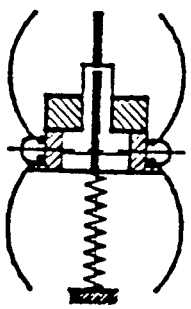 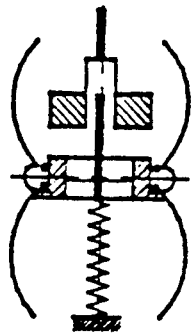
20
2
Fig.41 Fig.42 Fig.43
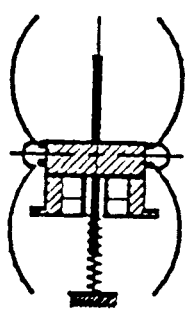 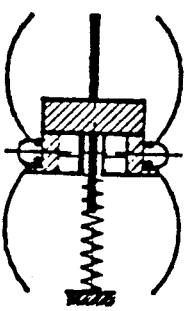 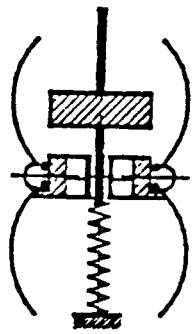
Fig.44 Fig.45 Fig.46

FIG.70
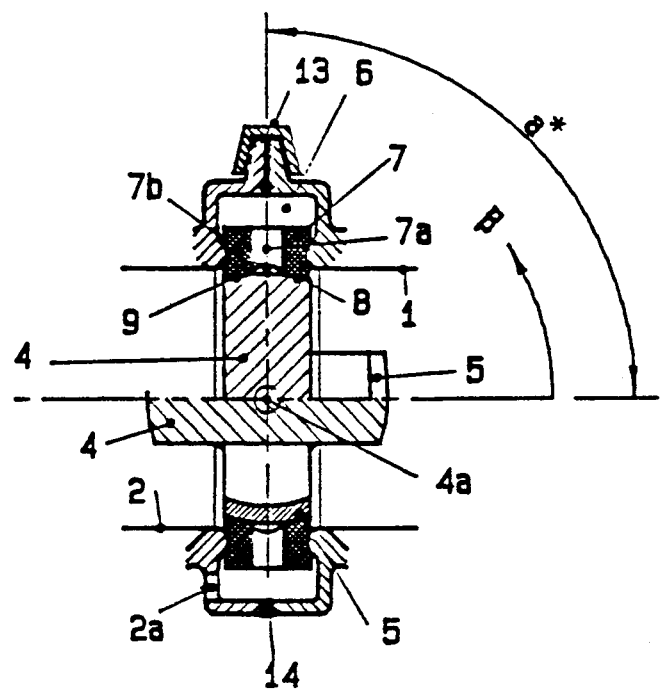
FIG.71
FIG.72
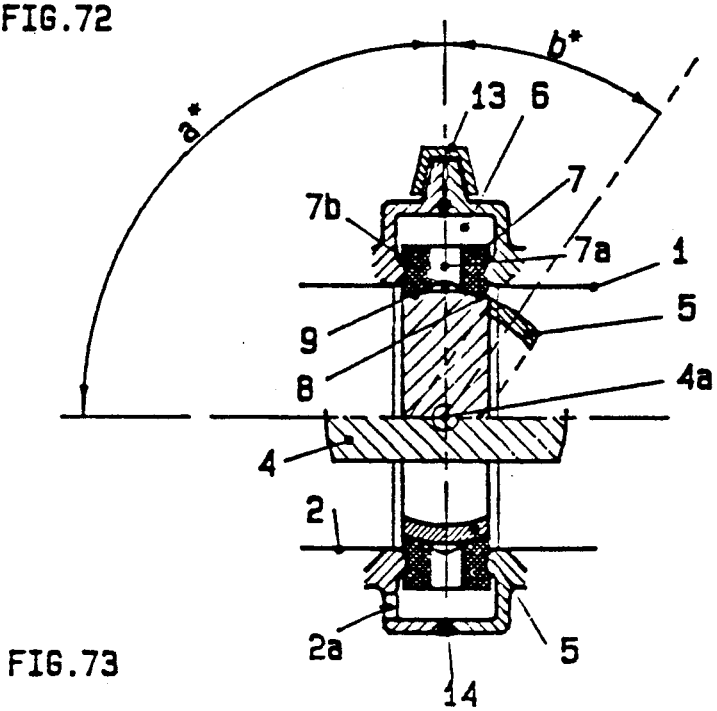
FIG.73

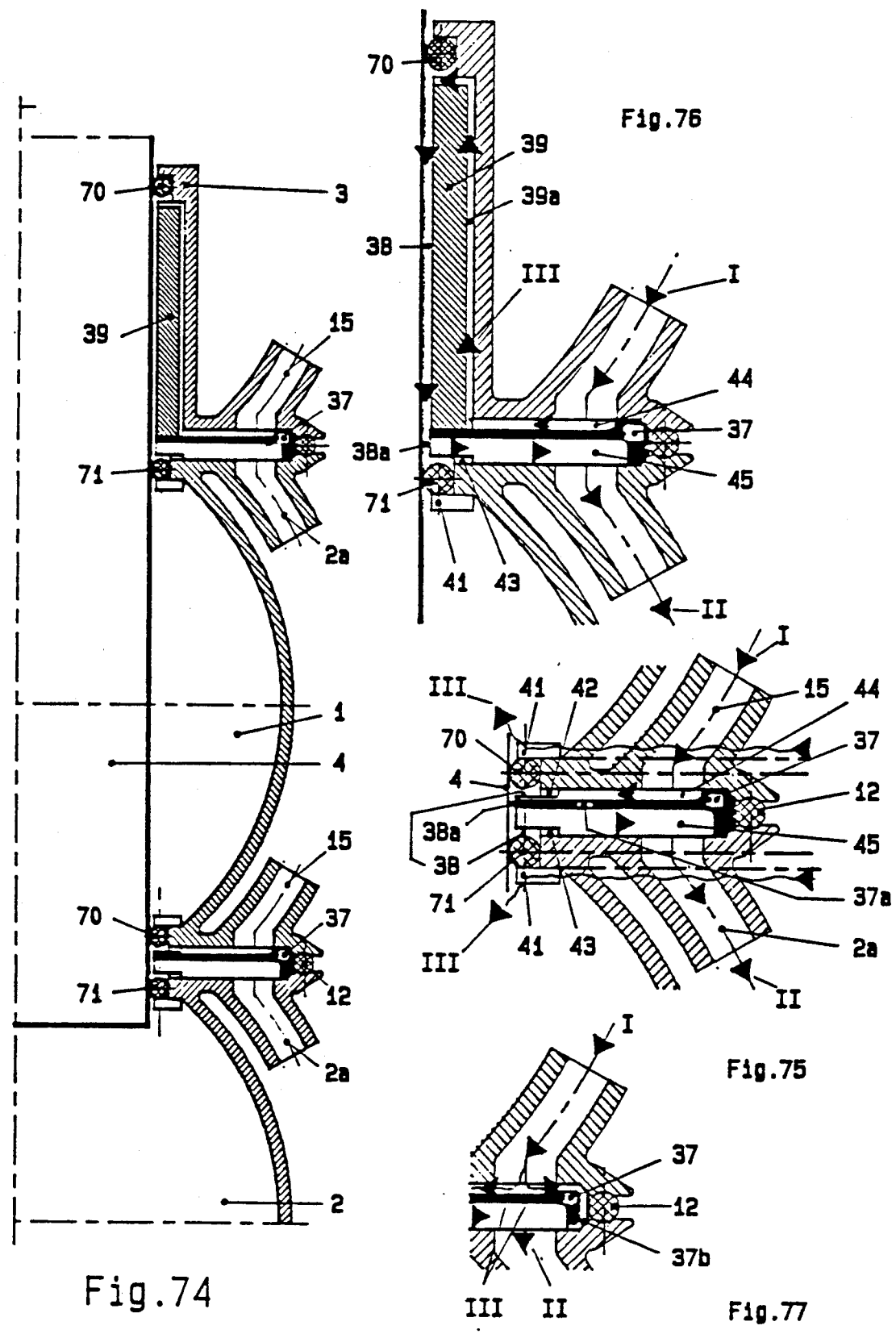

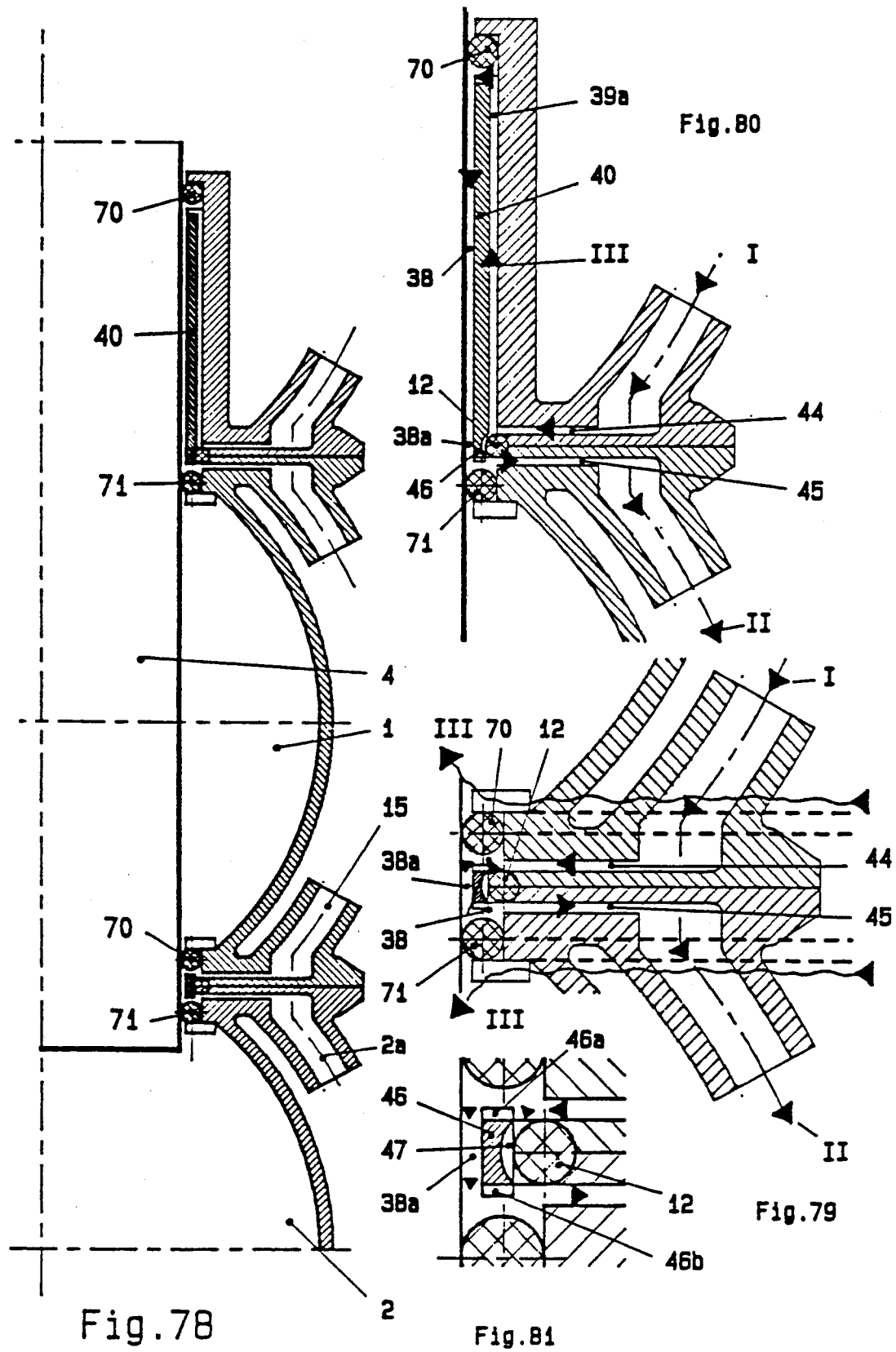

PROCESS FOR CONTROLLING A LEAKAGE CAVITY OF A VALVE AND AN APPARATUS THEREFOR

The invention relates to a process for controlling a leakage cavity of a valve according to the preamble of the main claim and an apparatus therefor.

A variety of valves having two sealing places provided are known. These sealing places are disposed in series and prevent in the closed position of the valve the overflow of fluid from one valve casing part into another one. All of these valves have in common that between the two sealing places there is disposed a leakage cavity discharging into the inside of the valve casing. Fundamentally this leakage cavity can be disposed in the closing body or the closing bodies, respectively, of the valve or in the casings thereof. In each case the leakage cavity inlet is located within the interior of the valve casing parts and is closed in all known valves of the category in question in the closed position of the valves by the closing body or the main regulating unit. The outlet of the leakage cavity is formed either on the closing body or closing bodies, respectively, or at the valve casing.

An analysis is given hereinafter of some known valves with two sealing places according to typical features and characteristics.

There are discussed the valves according to the German Utility Model 77 02 634, the European PS 00 98 418 and 02 05 627, the DE-OS 25 05 544, DE-OS 22 20 589 and DE-OS 35 16 128. In addition, a valve of the category characterized in the introduction became known under the designation VPL "SAFE FLOW" Valves by a company pamphlet of Messrs. PASILAC FLOW EQUIPMENT A/S (hereinafter briefly named "PASILAC").

The known valves according to GM 77 02 634, EP 00 98 418 and EP 02 05 627 each comprise two closing members of which either both are designed as seat disks (GM 77 02 634), or both as slides (EP 00 98 418), or one closing member as seat disk and the other as slide (EP 02 05 627). The known valves according to DE-OS 25 05 544, DE-OS 22 20 589, PASILAC and DE-OS 35 16 128 each have only a single closing member, the first three representatives comprising each one seat disk; the last one comprises a slide.

It is shown by the above indicated publications also that in all instances the leakage cavity inlet is closed in the closed position of the valve by the closing body or the main regulating unit, respectively.

In the valves according to GM 77 02 634, EP 00 98 418 and EP 02 05 627 is the leakage cavity outlet located in one of the two closing bodies, in the valve according to DE-OS 25 05 544 in the sole closing body. In the valves according to DE-OS 22 20 589, PASILAC and DE-OS 35 16 128 the leakage cavity outlet is provided in the casing.

In the open position of the valve the leakage cavity outlet is, according to the respective publication, closed by the auxiliary regulating unit only in the valves according to DE-OS 25 05 544, PASILAC and DE-OS 35 16 128. In all other known valves indicated above such a locking is indeed possible in principle, but is not explicitly mentioned.

Besides the normal switching function (open/closed) and in connection with the above-indicated property to prevent in the closed position of the valve the overflow of fluid from one valve casing part into another one, practice is posing more extensive demands on such valves, in particular for their use in fields of food processing and beverages, of Pharmacy and of Chemistry, to be satisfied either individually or in their entirety. Thus it is often desirable that the leakage cavity and the seat surfaces of the valve, individually and independently from one another, can be cleaned by lifting the respective closing member in question. This property is indicated for instance for the valves known from GM 77 02 634 or EP 02 05 627, respectively.

In addition it is often desirable that the leakage cavity can be cleaned not only in the closed position of the valve but also in its open position by cleansing fluid advanced from outside the valve. Such provisions are given for the valves known from GM 77 02 634, EP 00 98 418 and EP 02 05 627.

For reasons of safety it is often necessary that pressure impacts and pressure hammers are reduced into the leakage cavity by intentionally tolerating the pressing open and so opening of a sealing place of the valve into the leakage cavity. This characteristic (so-called "pressure relief leakage" provided by pressing open the valve) is shown in principle by valves which have available two closing members configurated as seat disks (GM 77 02 634); the valve according to EP 02 05 627 provides a pressure relief leakage in principle in one direction by means of the closing member designed as seat disk. In the valve according to DE-OS 35 16 128, a so-called compensating piston is disposed at the single closing member having the effect that displacements of the closing member into an open or partially open position by pressure impacts in the system which it can neither reduce nor decompose, are prevented. Such compensating pistons, however, reveal other considerable disadvantages in respect of sealing and cleansing the sealing, so that they are either avoided, if possible, or made utilizable by further additional measures.

A final and for certain purposes indispensable property of the valves discussed above is the leakage-free switching both in the opening and the closing motion of the valve. The so-called "switching leakage", which occurs via one of the valve casing parts into the leakage cavity whenever during the switching step a conduit is present between the latter and the interior of the valve casing parts, is prevented in the known valves merely according to EP 00 98 418 and EP 02 05 627.

The comparative analysis of the state of the art reveals that only the known valves in which two closing members are provided comprise a maximum of three of the four desirable or required characteristics mentioned above (GM 77 02 634 and EP 02.05 627 with three properties; EP 00 98 418 with two properties). The valve according to DE-OS 35 16 128, which has only one closing body, provides only one of the properties. For the above-indicated valves the expenditure required for the providing and drive of two closing members is naturally very high. The valves according to DE-OS 25 05 544, DE-OS 22 20 589 and PASILAC fail to reveal any of the above listed properties. The valves according to PASILAC and DE-OS 35 16 128 have the disadvantages that in the open position of the valve the leakage cavity outlet must be closed by an additionally required auxiliary regulating unit as otherwise product would discharge from the valve casing to the outside.

It is common in all of the valves indicated above, provided they comprise seals of circular cross-section in particular at the sealing places of the closing members as is the case for instance for the double seat valve according to DE-OS 35 16 128, that the sealing area, particularly the grooves of the seals, is cumbersome to cover in respect of cleansing technique.

The chamber between two sealings mentioned in the last named publication, which can be loaded with cleansing fluid, cannot effectively contribute to the cleaning of the grooves of the seals since the cleansing fluid cannot reach the grooves behind the seals during the flushing step of the said chamber. Such a measure can only, as is explained in the said publication, prevent that for instance the part of the valve body protruding outwardly becomes infected and contacts the liquid to be transported.

Starting from the discussed state of the art the invention is based on the problem to control in a valve of the category characterized in the introduction in addition to the control of the connection between the leakage cavity and the interior of the valve casing parts in the closed position of the valve known per se the said connection also in other positions of the valve.

In addition, it is the object of the present invention to provide both a process and an apparatus for cleaning a dynamically loaded seal assembly of a valve, in particular the valve of the category characterized in the introduction, in which the sealing places are formed by seals having circular cross-section, allowing a safe yet simple cleaning of the said seal assembly, particularly even of those areas in the grooves for the seals which in the known assemblies are only cumbersome to include.

The advantages achieved by the invention reside in particular in that the apparatus proposed for the realization of the inventive process is in principle capable of realizing substantially all of the above mentioned desirable and/or necessary characteristics in their entirety, although it is fitted only with a single closing member for the main passage through the valve.

In this aspect the subject matter of the invention manages with a minimum of structural parts. By the feature that the connection between the leakage cavity and the inside space is closed according to the invention by a locking piece also in positions other than the closed position of the valve it is prevented that the leakage cavity becomes in such positions converted to a component of the product chamber or product path, respectively. Accordingly the demands on its spatial shape can be held as low as possible. Moreover, it is evident that the motion of the locking piece takes place in direct dependence from the closing member or else, in view of its relative mobility to the closing member, in logical dependence upon it.

In addition, it is also noteworthy that the salient feature of the invention is employable both to an article in which the closing member is moved by translatory displacement in the valve casing and to an article in which it is moved rotatively. In the latter instance it is also spoken of a rotary disk valve; practice coined for such valves also the term "disk valve".

The process and the apparatus for cleaning a dynamically loaded seal assembly guarantees now for the first time for the utilization of seals having circular cross-section that a reliable and thorough cleaning of all regions of the seal and its grooves is feasible. This is achieved once by the accessibility of the seals for the cleaning from the sides of the groove flanks, which are designed permeable for liquids, and secondly, by the limited mobility of the seals in the direction of the motion of the closing member or the valve stem, respectively.

The process proposed above and the apparatus for its performance present especially for their application to the process and the apparatus for the control of a leakage cavity of a valve for the latter article a further series of advantageous solutions, which on the one side render possible the advantageous use of simple seals with circular cross-section, which had been technically dubious and problematic hitherto in respect of cleaning technique, and on the other side simplify the sealing area and make it easy to clean.

With the apparatus for the control of a leakage cavity of a valve there is possible both the cleaning of the leakage cavity and the so-called seat cleaning by lifting the closing member or the locking piece. In case said cleaning variation is effected by means of the motion of the closing member, the valve is in a closed position, whereas a corresponding motion of the locking piece permits the cleaning of the leakage cavity or of the seat in the open position.

If in accordance with an advantageous embodiment of the apparatus according to the invention the locking piece is firmly fixed to the closing member a nearly leakage-free switching is possible during the closing motion in that either the conduit temporarily present between the inside space of the valve casing and the leakage cavity or the discharge mouth of the leakage cavity is closed by controllable locking means which are actuated either directly or indirectly by the motion of the closing member. A nearly leakage-free switching in a valve having the above-indicated configuration of the closing member is achieved also with quite simple means—although renouncing to the highest possible degree of safety—inter alia by the arrangement of a control ridge of equal height between the closing member and the locking piece.

The so-called "switching leakage" can indeed not be prevented absolutely by the measures proposed above as is the case for the leakage-free switching with unrestricted relative mobility between closing member and locking piece, but by the said measures it can be limited in many instances of application to a tolerable rate. Consequently in this case it should be spoken more appropriately of a "limited leakage" switching.

When the closing piece, as is provided in an advantageous embodiment of the apparatus according to the invention, is designed as a cylindrical, annular body which has opposite to the sealing places the appropriate shape and the dimensions of the closing member, and its penetration aperture, in accordance with a further advantageous embodiment of the apparatus according to the invention, expediently corresponds to the nominal cross-section of the valve, there is obtained in combination with the advantageous arrangement of seals disposed on the side of the casing an overall assembly in which the seals in positions other than in the closed position of the valve are hardly subjected to either product or cleansing fluid action and therefore suffer nearly no wear in this respect.

When the closing piece is firmly fixed at a distance to the closing member, there is obtained, as is provided by a further advantageous embodiment of the apparatus according to the invention, an assembly which is extraordinarily simple in respect of the drive of the valve since only the closing member must be actuated. In addition it is fluidically advantageous when the penetration cross-section usable between the closing member and locking piece corresponds to the nominal cross-section of the valve.

When the locking piece, as is proposed in another advantageous embodiment of the apparatus according to the invention, is disposed relatively movable to the closing member in the direction of the degree of its freedom of motion, it is proposed according to the invention to connect the locking piece with a stem which is extending from the respective associated valve casing part. On principle the stem necessary for the actuation of the closing member and that of the locking piece can be led out of the valve casing either in the same or in the opposite direction. In the former instance, an advantageous development of the apparatus according to the invention provides that the stem of the closing piece is journalled either on or in, respectively, the stem actuating the closing member. In this manner there is required only one passage for the stem in the valve casing.

Another embodiment of the apparatus according to the invention manages likewise with a single passage for the stem in the valve casing since solely the closing member must be actuated obligatorily and the locking piece is guided in or on the closing member. A spring between the closing member and the locking piece or between the valve casing and the locking piece causes the closing piece to be taken along in direction of the switching travel of the closing member. In order to prevent that the closing piece becomes displaced in the open position of the valve beyond its seat region it is provided with a stop.

In respect of the arrangement of the locking piece with reference to the closing member the last named embodiment also allows the basic solutions indicated already above. Regarding the position of locking piece in relation to the closing member, however, one restriction is given as compared to solutions in which both valve stems are extending into the outside of the valve. The restriction is that in the closed position of the valve the closing member and the locking piece are not disposed at a distance from each other which is forming a circular gap as is the case in another embodiment of the apparatus according to the invention having two stems led to the outside region of the valve. In case this disadvantage, which causes within the valve cases the so-called formation of puddles or domes in the area of the contact site between locking piece and closing member, is undesired cannot be tolerated the said drawback can be removed by another embodiment of the apparatus according to the invention. For the said purpose it is provided that the stem of the locking piece by which it is guided in or at the closing member is connected to a drive piston which is sealingly conducted within the closing member and with the latter defines a drive chamber which via the stem of the closing member is connected with a pressure medium connection. By triggering the said drive chamber it is possible to form the gap mentioned above which prevents the formation of puddles or domes, respectively, also in positions other than the open position of the valve, in which required penetration gap between locking piece and closing member is guaranteed mandatorily by the causal motion of the closing member and the stop at the locking piece.

The locking piece can be disposed either on the one or on the other side of the closing member. In the event both stems point in one direction and are conducted out of the valve casing, the arrangement of the locking piece on the side of the closing member which is averted from the side of the stems, there will be obtained all in all shorter stems with the consequence of preciser guidance of closing member and locking piece.

The reversed case is, owing to the longer stems, better suited for an embodiment with bellows in the area of the stem passage on the side of the casing.

All of the embodiments of the valve according to the invention mentioned above without exceptions have to be fitted with a compensating piston on the one and/or the other side of the closing member so that pressure forces causing an opening of the valve or pressure forces obstructing the opening can be compensated fully. The proposed solutions provide advantages in particular in that, as is shown by one embodiment, the closing member and the compensating piston are connected with each other by means of at least one connection piece, wherein in each case a centric region around the axis of symmetry of the compensating piston and the closing member is left clear of the connection piece or pieces, respectively. Owing to this measure the centric region around the axis of symmetry is available for the passage of the stem of the locking piece so that particularly sealing problems are avoided and the bridging of a penetration gap obligatorily necessary between the stem of the locking piece and the closing member is permitted in a simple manner by the arrangement of a bellows.

Moreover, the further advantageous embodiments of the apparatus according to the invention which are explained in the following with reference to the respective figures in more detail show that all embodiments of the valve with one or two compensating pistons as well as even those without compensating piston can be fitted in all areas in which dynamically loaded seals are disposed with a bellows for bridging the critical penetration sites. This is applicable likewise for the penetration sites between compensating piston and valve casing or between stem and valve casing, as well as for the penetration site between the stems of locking piece and closing member or between the stem of the locking piece and the stem of the closing member or the compensating piston, respectively.

In the proposed valve, the sealing places can be realized according to the invention by means of sealing means disposed either on the side of the valve casing or on the side of closing member or of locking piece. In each case it is provided that between the sealing places there is formed a circular groove open to the inside space of the valve casing and connected on the side of the valve casing by means of at least one connection conduit to the environs of the valve. As a consequence any leakage possibly occurring at whatever area of the sealing places can be collected and discharged into the environs of the valve. In the normal case the above groove forms in combination with the closing member or the locking piece already the necessary leakage cavity. More extensive hollow spaces are in most cases not required; on the contrary, in aspects of cleaning technique they are critical and hence harmful.

A further advantageous embodiment of the apparatus according to the invention permits both in the closed and in the open position of the valve a cleaning of the leakage cavity by cleansing fluid advanced to the valve from outside. This is achieved inter alia in that in the connection level between the valve casing parts and between the leakage cavity and the casing seal there is provided a conduit into which the cleansing fluid can be supplied from outside the valve via a connection port. The cleansing fluid then spreads via the conduit around the leakage cavity and penetrates the leakage cavity via a circular annular gap. Said annular gap is expediently designed so that is has the effect of a nozzle gap for the cleansing fluid, thus purposefully jetting and effectively cleaning the leakage cavity and the adjacent seals. Another embodiment provides that the discharge mouth of the conduit is designed in form of discrete, geometrically defined apertures or as a plurality of geometrically undefined apertures which are, moreover, expediently so aligned that the streaming fluid is imparted with a swirling velocity component. Owing to this measure the leakage cavity is directly sprayed and thus effectively cleaned. By means of a main drain the cleansing fluid is in accordance with a further embodiment of the apparatus according to the invention discharged via a discharge mouth to the outside of the valve. For this purpose the main drain is connected to a region of the leakage cavity which is not bounded by the conduit. These measures as indicated above safeguard a uniform distribution of the cleansing fluid in the leakage cavity and a collecting of the cleansing fluid subsequent to the flushing. When the discharge mouths of the conduit are disposed in a manner that they are partly bounded by the seals at least that region of the seals which is located between the sealing places in the area of the valve casing is subjected to a flooding with cleansing fluid and thus perfectly cleaned.

A complete cleaning of seals having circular cross-sections is, as already explained in the introduction, provided by the process and the apparatus proposed according to the invention for the cleaning of a dynamically loaded seal assembly. When employing said process and said apparatus, there are cleaned perfectly not only the part of the seals on the side of the valve casing in the region between the sealing places but also the respective area on the other side. The complete flushing of the seal with cleansing fluid up to the contact surfaces temporarily present at the sealing places with the valve part on the one side and the casing on the other side is achieved inter alia in that each seal on its side facing the space to be sealed is bordered by a liquid permeable boundary wall, and in that each of the seals in the direction of movement of the closing member or of the stem reveals a limited mobility. In order to permit the advance of cleansing fluid also to the temperarily present contact surfaces of the seal it is provided according to the invention that as a consequence of the movement of the closing member or of the stem, respectively, the formation of another contact surface at the same sealing place or the same or another contact surface of the seal at another sealing place is allowed. This is achieved in contrast to the ordinary arrangement of such seals in grooves of narrow dimensions by a generously dimensioned groove in which the seal can move with axial clearance.

By the arrangement of a disk which dips with a separating wall into an annular space between the seals and which at its surfaces contacting the seals is designed so that in any sealing state a passage of cleansing fluid between the seal and the separating wall is secured, the region between the seals bordered outwardly by the seals themselves can be perfectly cleaned by forced passage. The spaces on either side of the separating wall each have a connection to the environs of the valve and their passage cross-sections are expediently dimensioned so that the space which drains the leakage and the cleansing fluid is designed larger than that by which the cleansing fluid is supplied to the region between the seals.

When using the above indicated disk for the purpose of concerted advance and draining of the cleansing fluid the casing seal required between the valve casing parts is disposed at the outer circumference of the disk.

At this location it cannot be replaced in an assembled valve in case of a defect. Therefore there is provided by another embodiment of the apparatus according to the invention to locate the necessary casing seal in the direct proximity of the seals so that it can be replaced via the inside space of the valve casing parts. For this purpose there is also provided a retaining ring which on the one side supports the casing seal and on the other side leaves open between itself and the valve part a penetration gap, thus providing an interconnection of the partial spaces formed by the retaining ring in the annular space between the seals, and that the partial spaces of the annular space within the respective associated valve casing part are connected with a connection opening or discharge mouth, respectively. This solution permits the exchange of the casing seal in a very simple manner in that after the removal of a seal the retaining ring can be axially displaced into the seat region of said seal to such an extent that the casing seal to the inside space of the valve casing parts is exposed and thus accessible from the inside space. The retaining ring is expediently so designed that it is indeed capable of exerting radial support forces on the casing seal but in axial direction is freely movable in both directions up to the abutment at the respective seal. Owing to this the respective seal concerned, in case of pressure admission on the inside spaces of the valve, can move towards the retaining ring so far until it abuts at it and displaces it axially up to its abutment at the other seal. The effect of support of the retaining ring in respect of the casing seal is not lost by its limited axial mobility according to the invention.

In case the seal is designed, as is provided by another advantageous embodiment of the apparatus according to the invention, twisted in itself by 360 degrees in such a manner that all feasible fibers enclosing the torus axis of the seal are of equal lengths, it will render feasible a longitudinal extension-neutral twisting of the seal in itself without restoring moments owing to sealing elasticity. In this manner there are provided as consequence of the switching motion of the closing member or the stem, respectively, constantly changing contact places at the seal, thus additionally promoting a reliable and perfect cleaning of sealing areas critical per se as endeavoured by the invention.

Examples of embodiment of the invention are illustrated in the drawing and explained in detail hereinafter.

Figure 4:
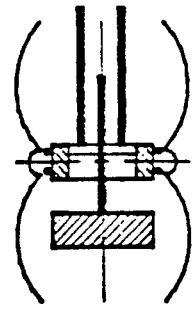
Figure 5:
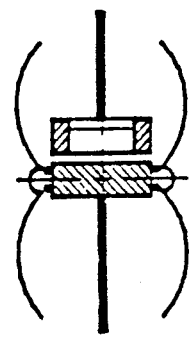
Figure 6:
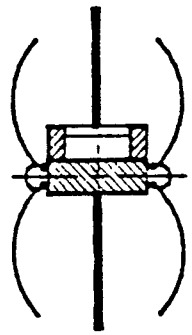
Figure 7:
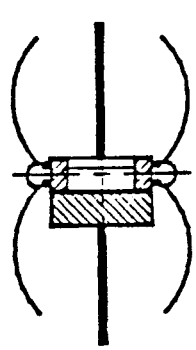
Figure 8:
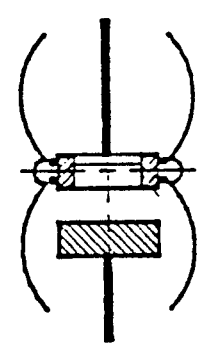

There are shown in:

FIGS. 1 to 16—in simplified schematic illustrations fundamental configurations of closing member, locking piece and valve casing according to the invention, in each case being shown the closed position, the pick-up position, the intermediate position and the open position;

FIGS. 17 to 20—a center section through an advantageous embodiment of the apparatus according to the invention as derived from FIGS. 1 to 4, having a one-piece seal provided;

FIGS. 21 to 34—each a center section through a further embodiment of the apparatus according to the invention, wherein in each case the illustration on the left-hand side shows the fundamental configuration of closing member and locking piece according to FIG. 1 and the illustration on the right-hand side the respective open position of the valve according to FIG. 4.

In detail there is shown in

Figures 21, 22:
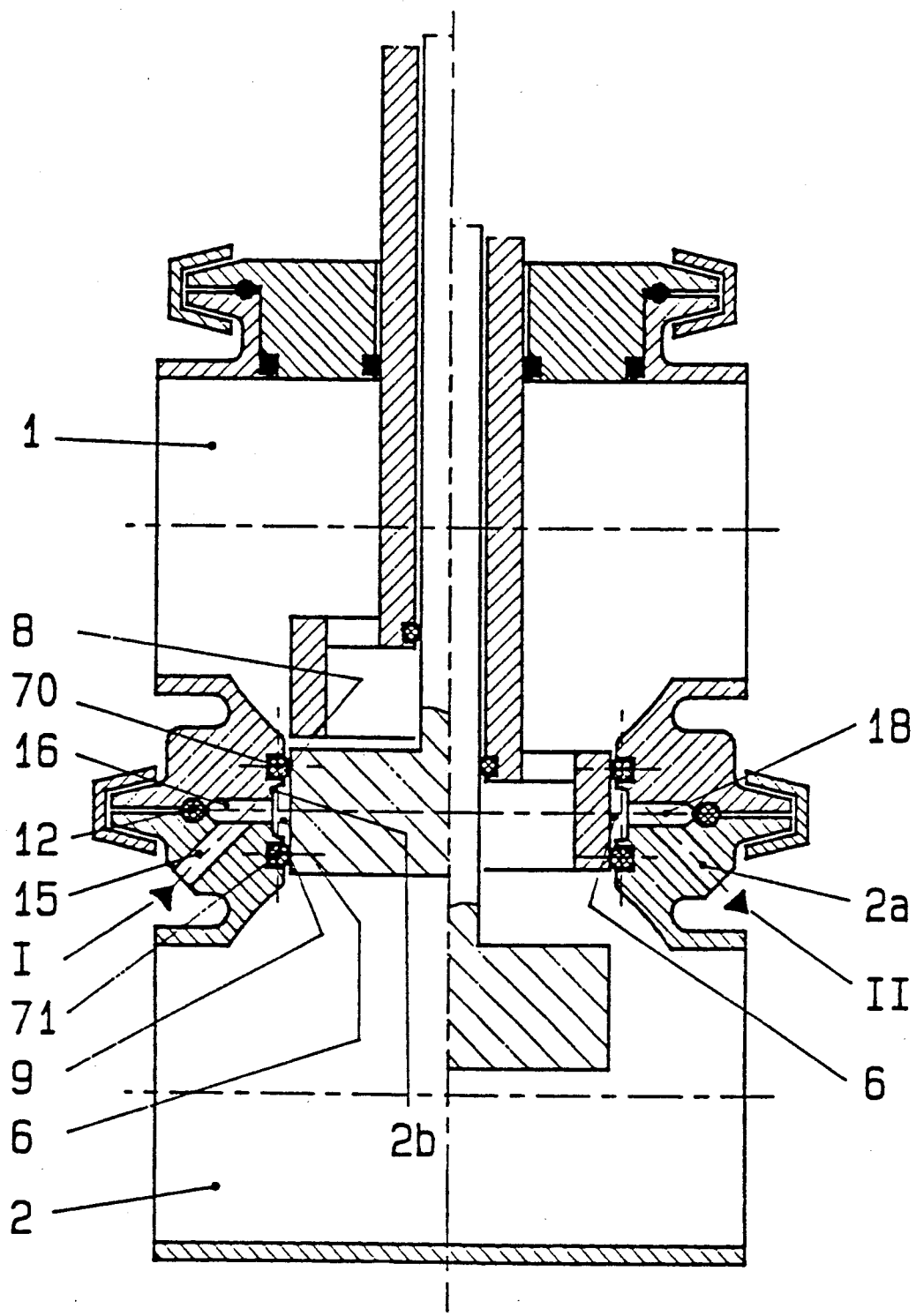
Figures 23, 24:
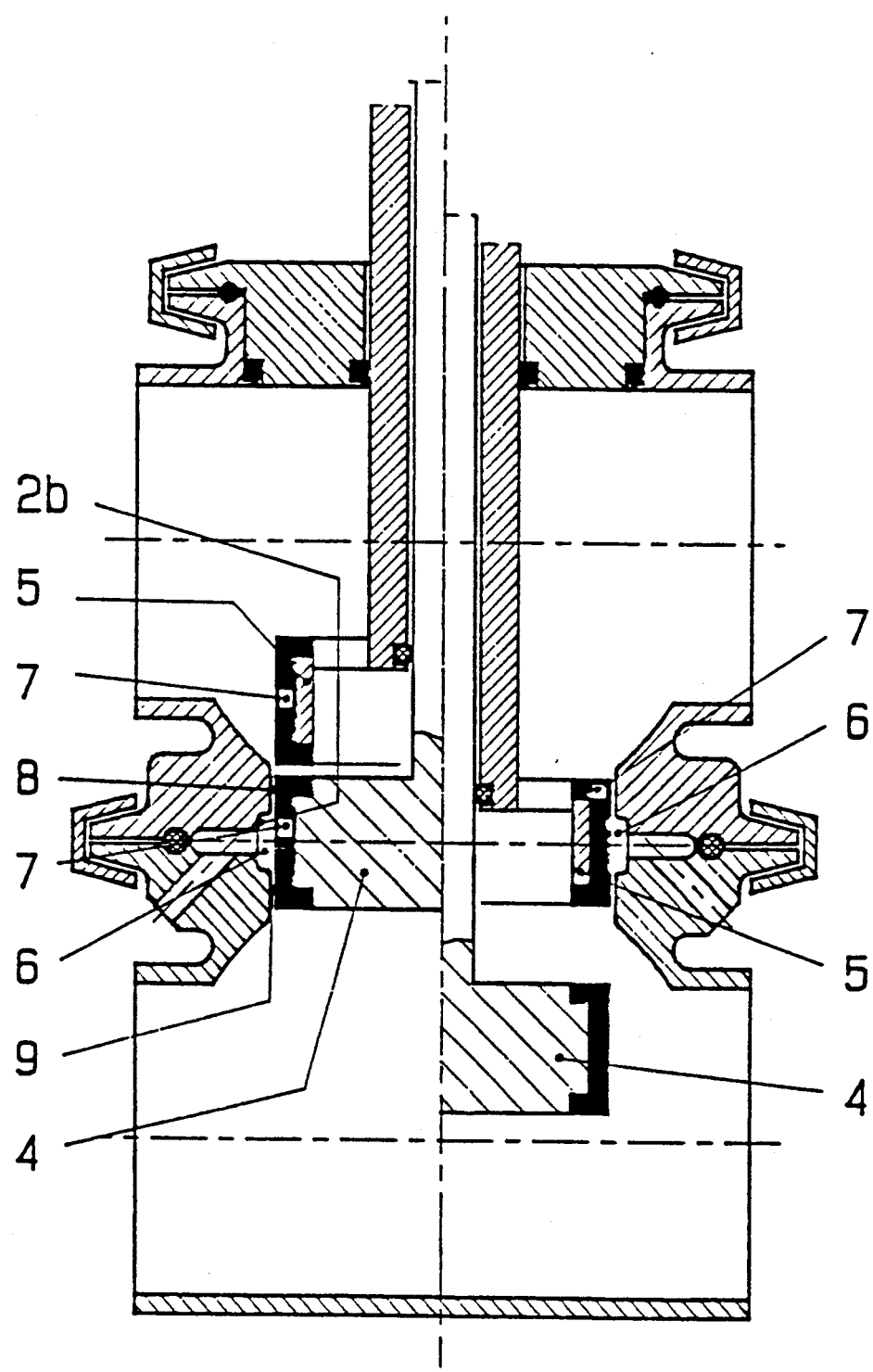

FIG. 21, FIG. 22—a sealing area with seals disposed on the side of the casing;

FIG. 23, FIG. 24—a one-piece seal, with which the closing member or the locking piece, respectively, is fitted as a whole.

Figures 25, 26:
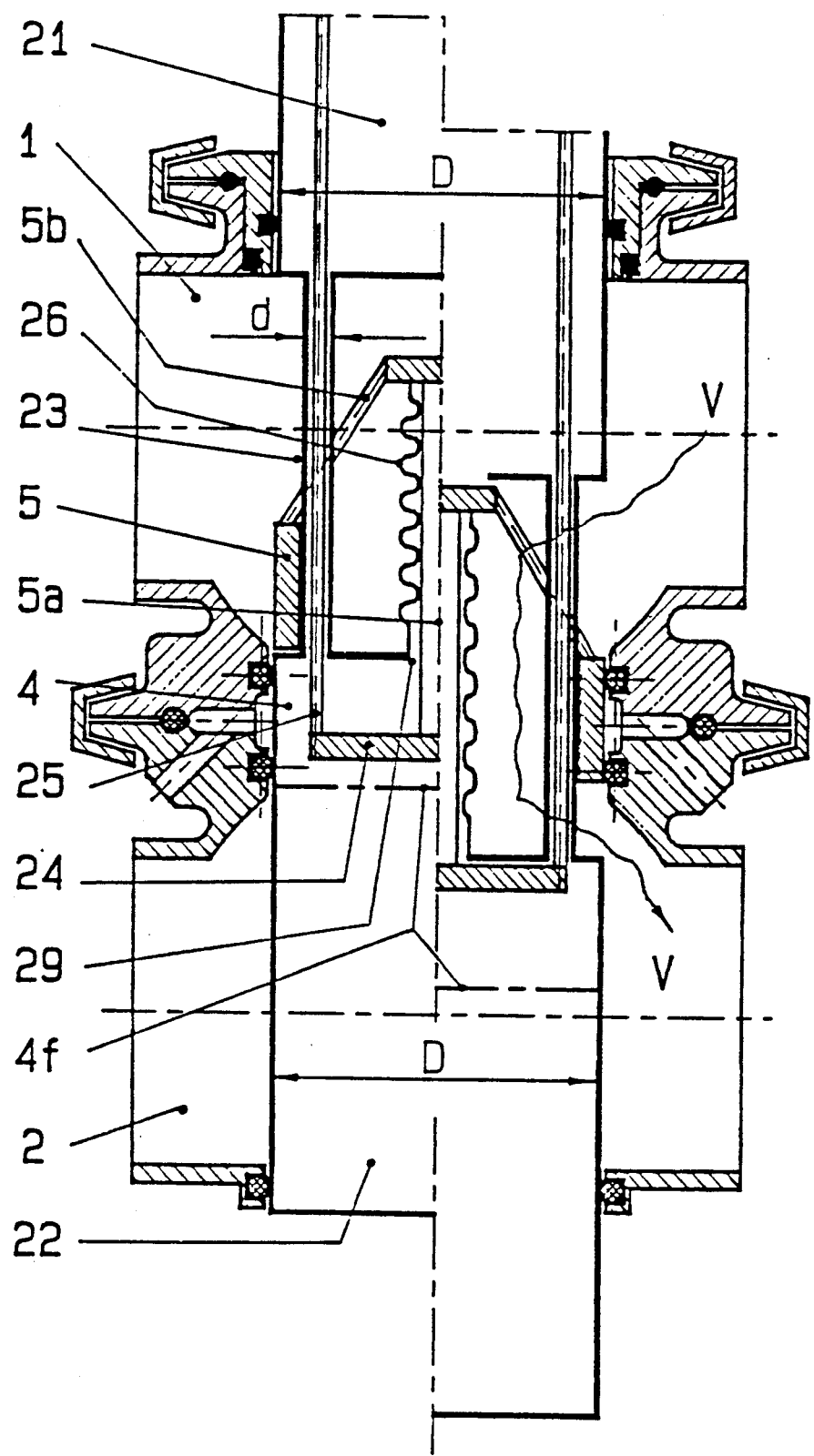
Figures 27, 28:
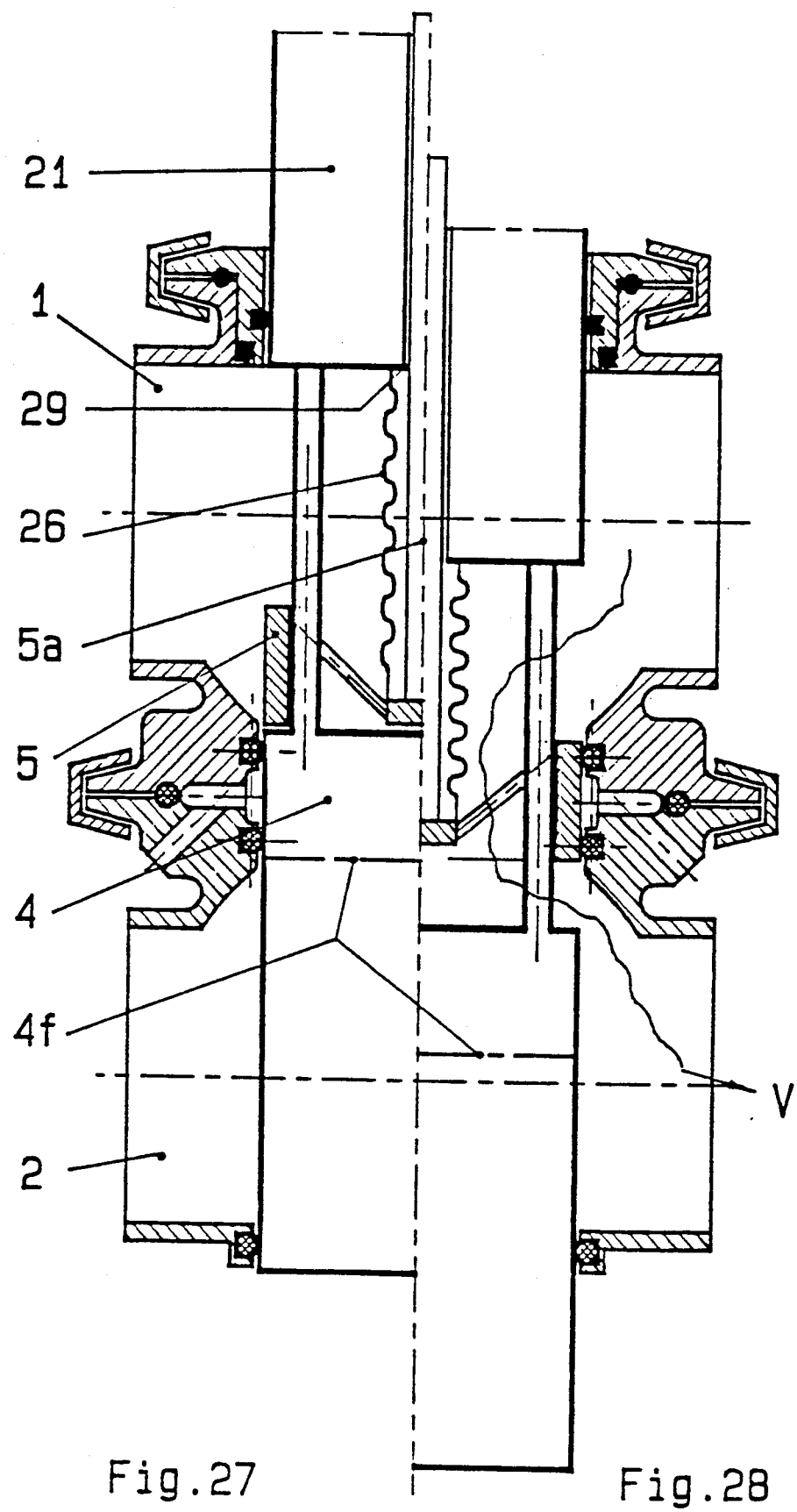
Figures 29, 30:
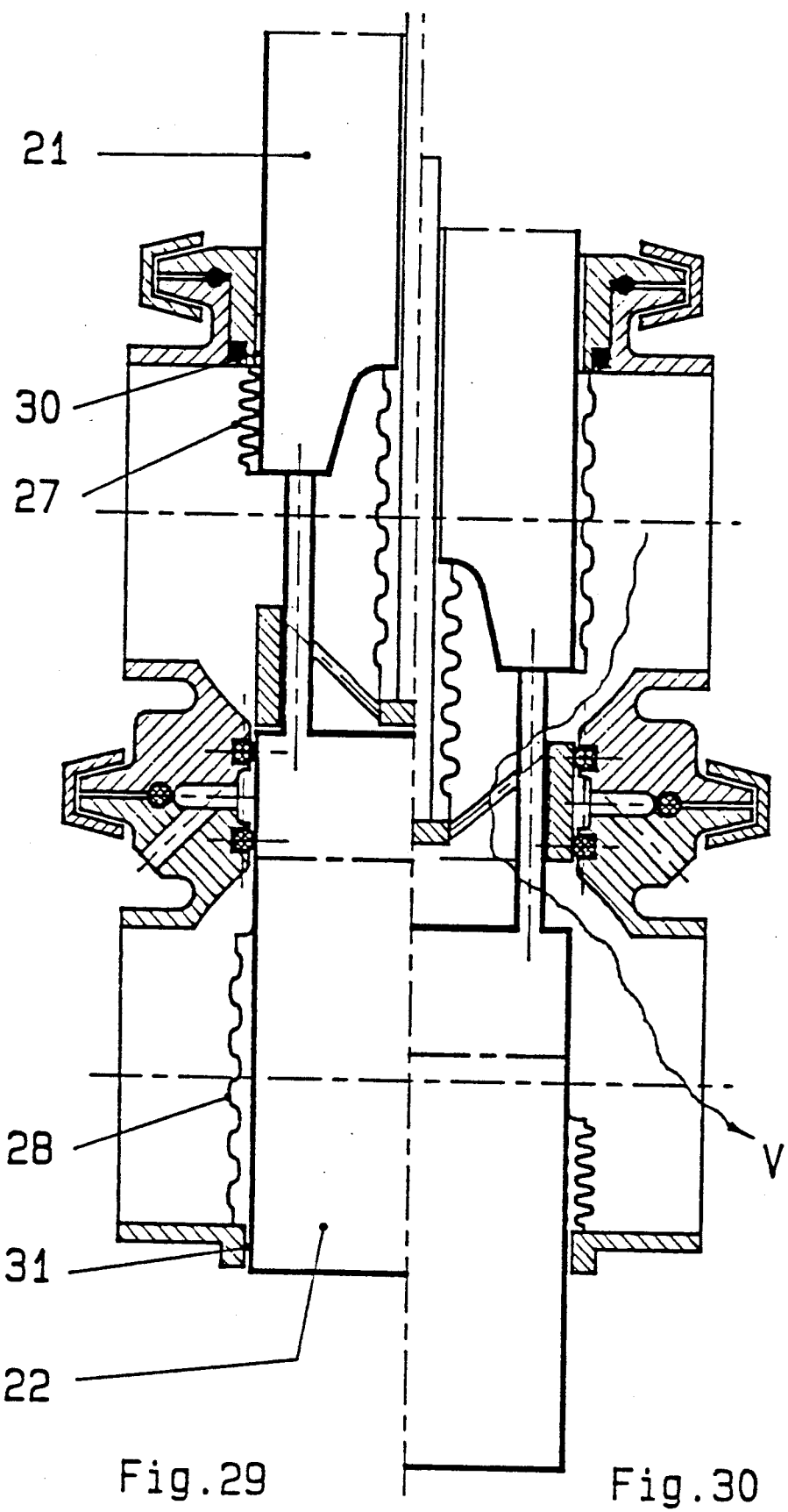
Figures 31, 32:
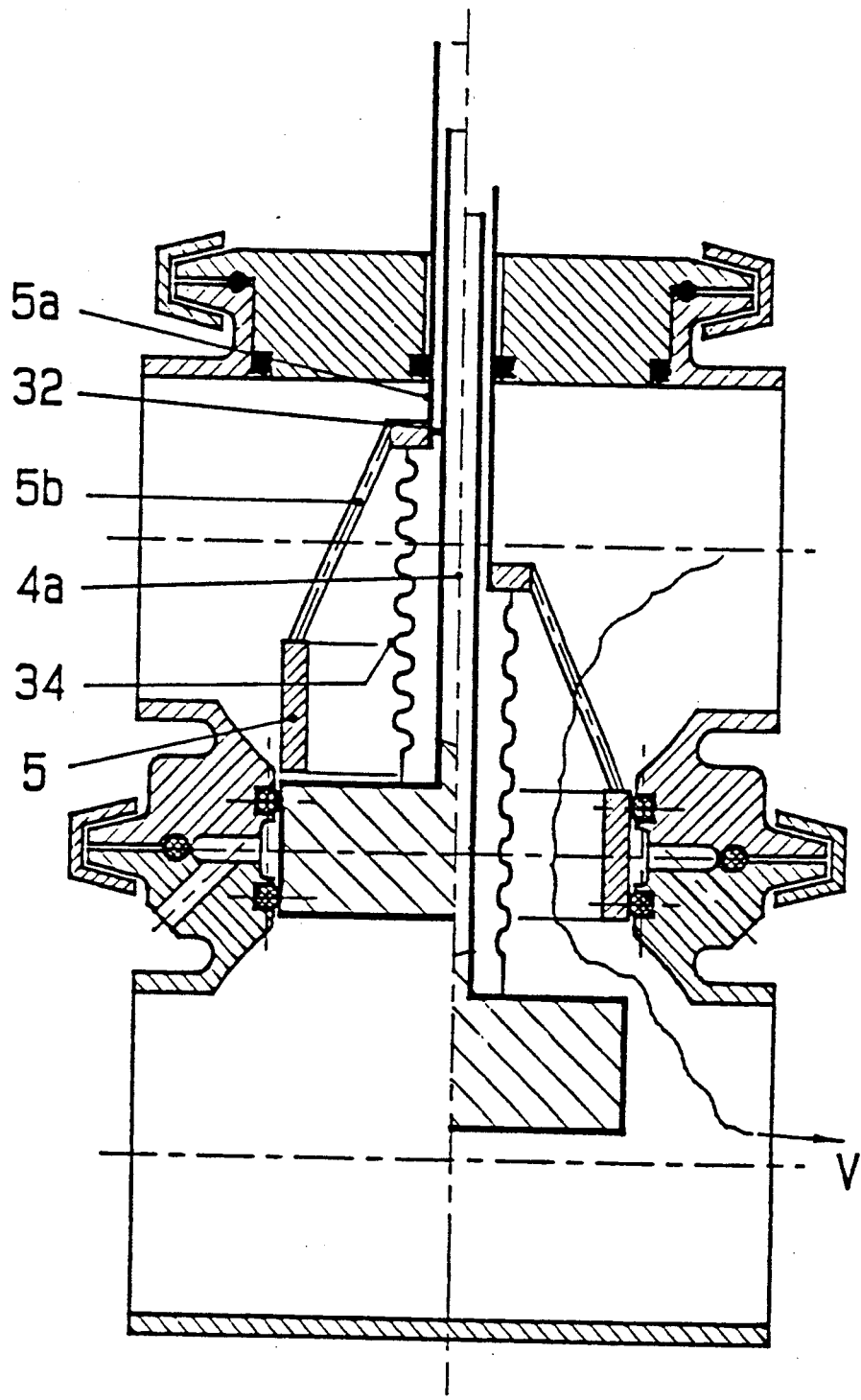

FIG. 25, FIG. 26—a closing member equipped with two compensating pistons, the actuation of the locking piece being effected by means of an excentrically guided actuating rod;

FIG. 27, FIG. 28—an embodiment with two compensating pistons, a rod actuating the locking piece being disposed centrically;

FIG. 29, FIG. 30—a further embodiment of the apparatus according to the invention, having two compensating pistons, each being individually sealed against the valve casing by a bellows;

FIG. 31, FIG. 32—an embodiment with a bellows between the two stems; and

Figures 33, 34:
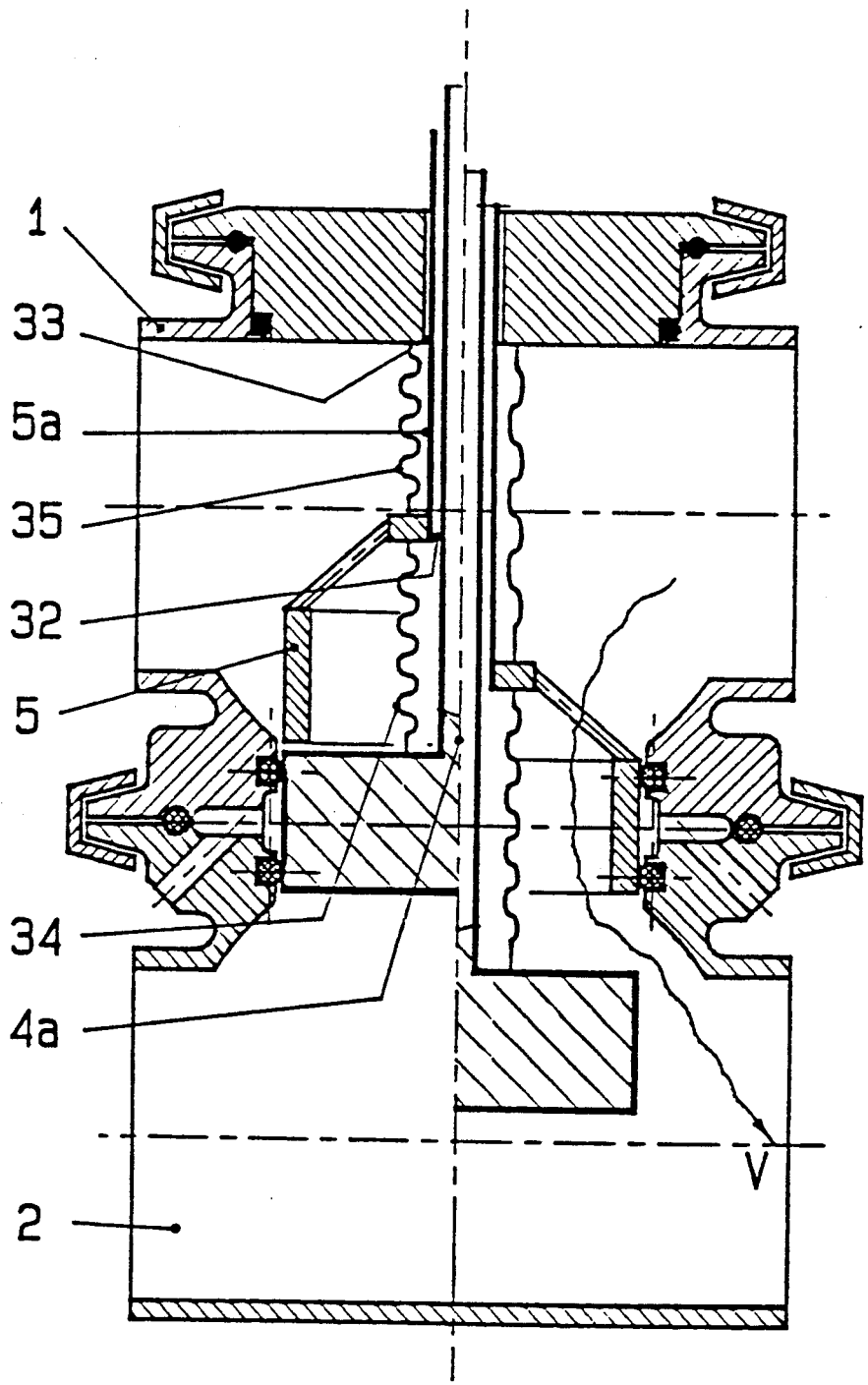
Figure 48:
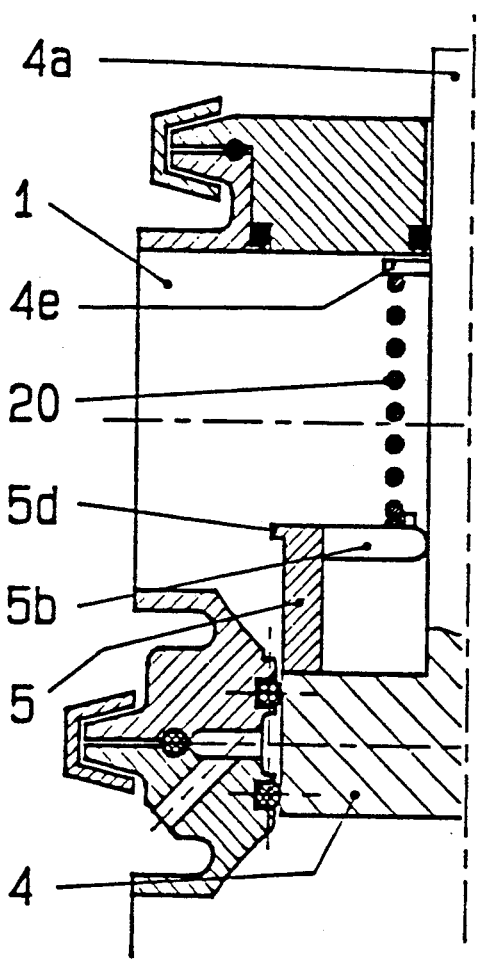
Figure 49:
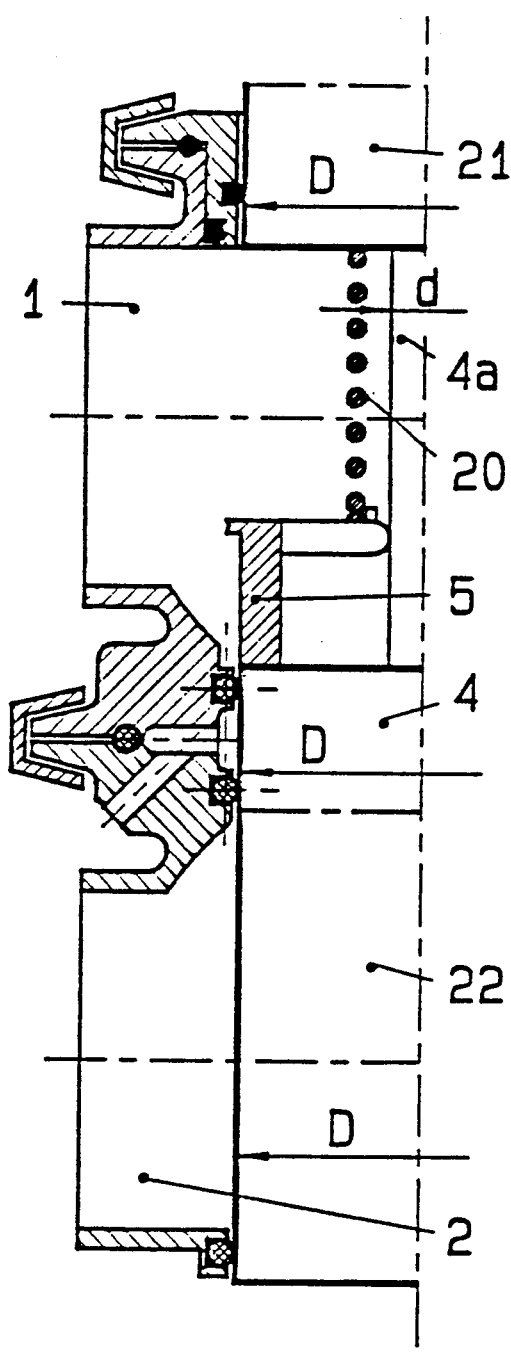

FIG. 33, FIG. 34—a further embodiment in which the penetration sites of the said two stems are bridged each by a bellows;

FIGS. 35 to 46—in simplified schematic illustrations basic configurations of closing member, locking piece, and valve casing corresponding to the configurations according to FIGS. 1 to 16 in the closed, the intermediate, and the open positions of the valve, merely the stem of the closing member being led out of the valve casing and a spring being provided between locking piece and valve casing;

FIG. 47—another arrangement according to the FIGS. 35 to 37, wherein a spring is provided between the locking piece and the stem of the closing member;

FIG. 48, FIG. 49—a center section through an embodiment shown in detail according to FIG. 35 or FIG. 47, respectively.

Figure 9:
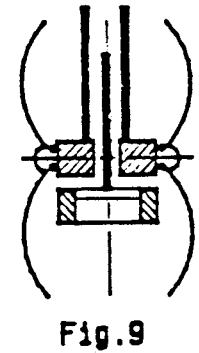
Figure 10:
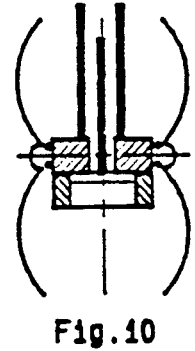
Figure 11:
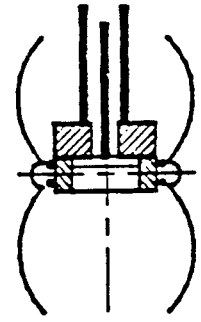
Figure 12:
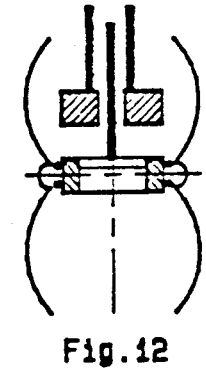
Figure 13:
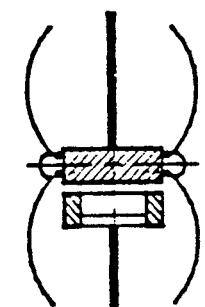
Figure 14:
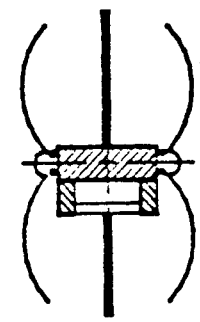
Figure 15:
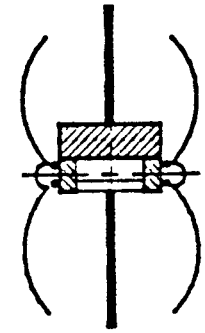
Figure 16:
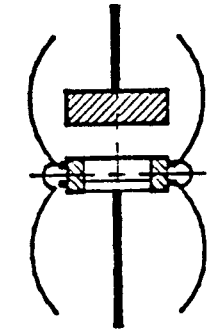
Figure 50:
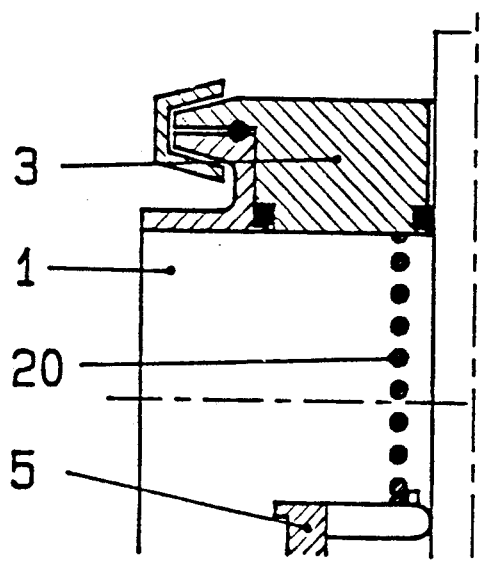
Figures 51, 52:
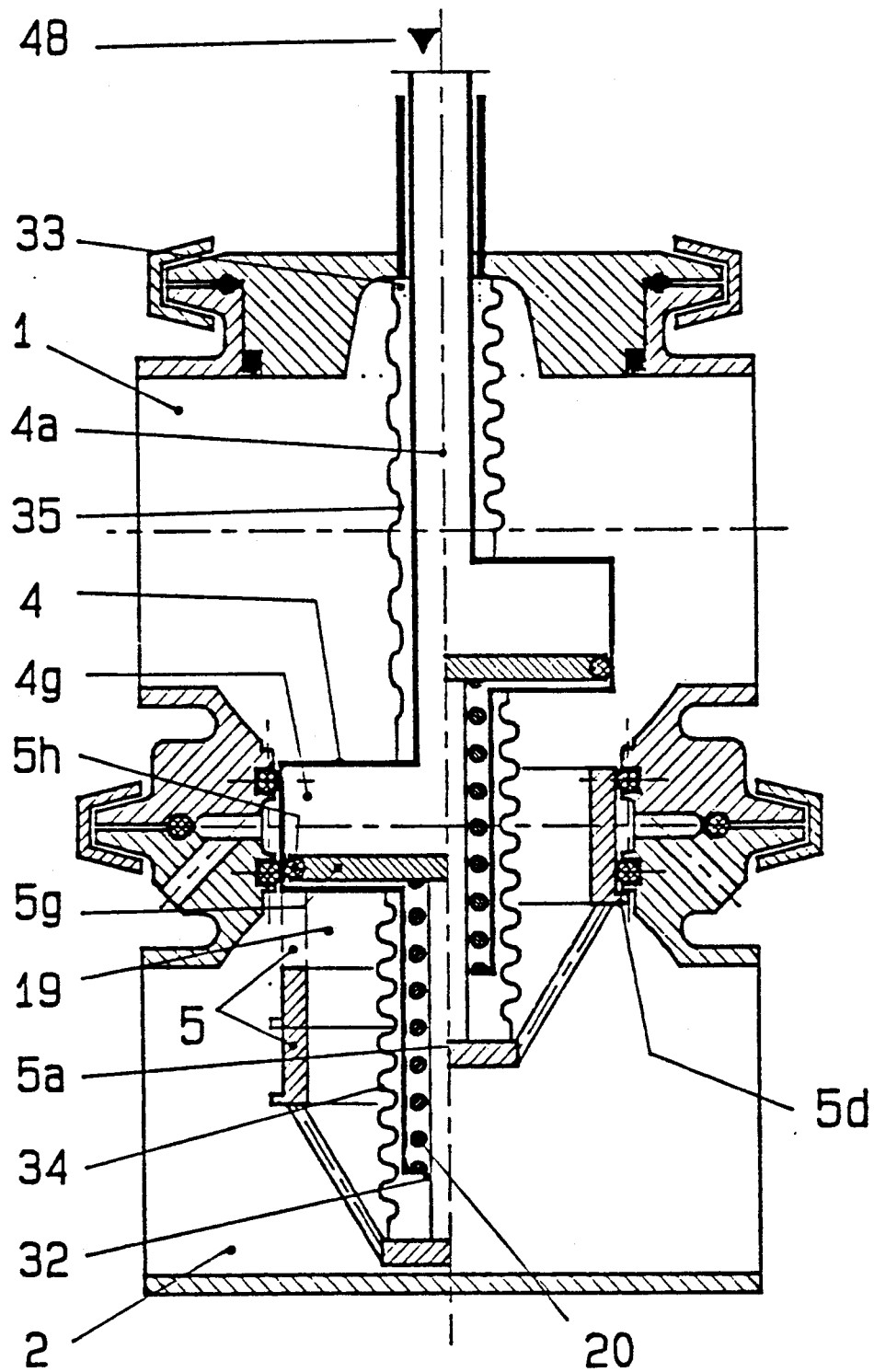
Figures 53, 54:
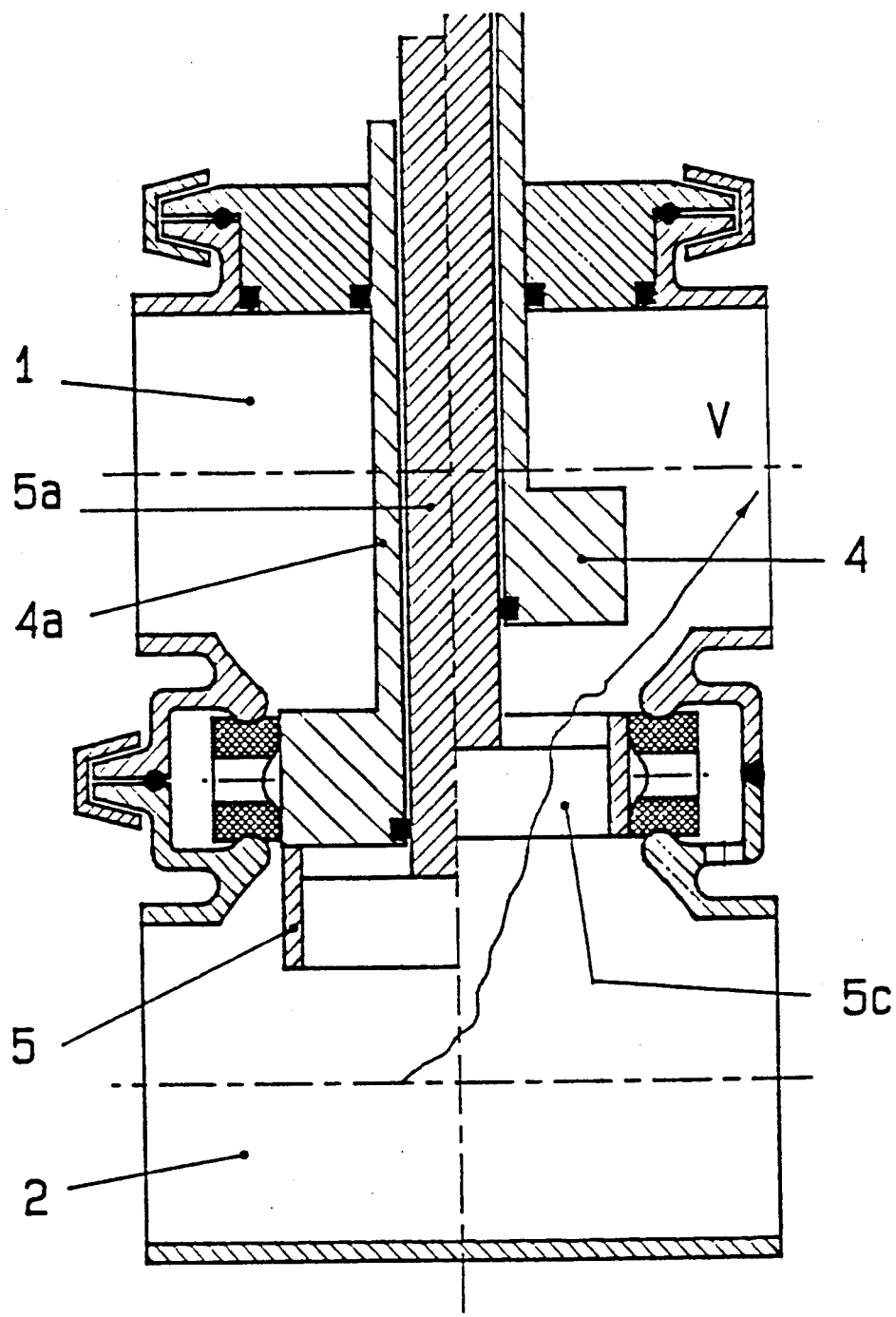
Figures 55, 56:
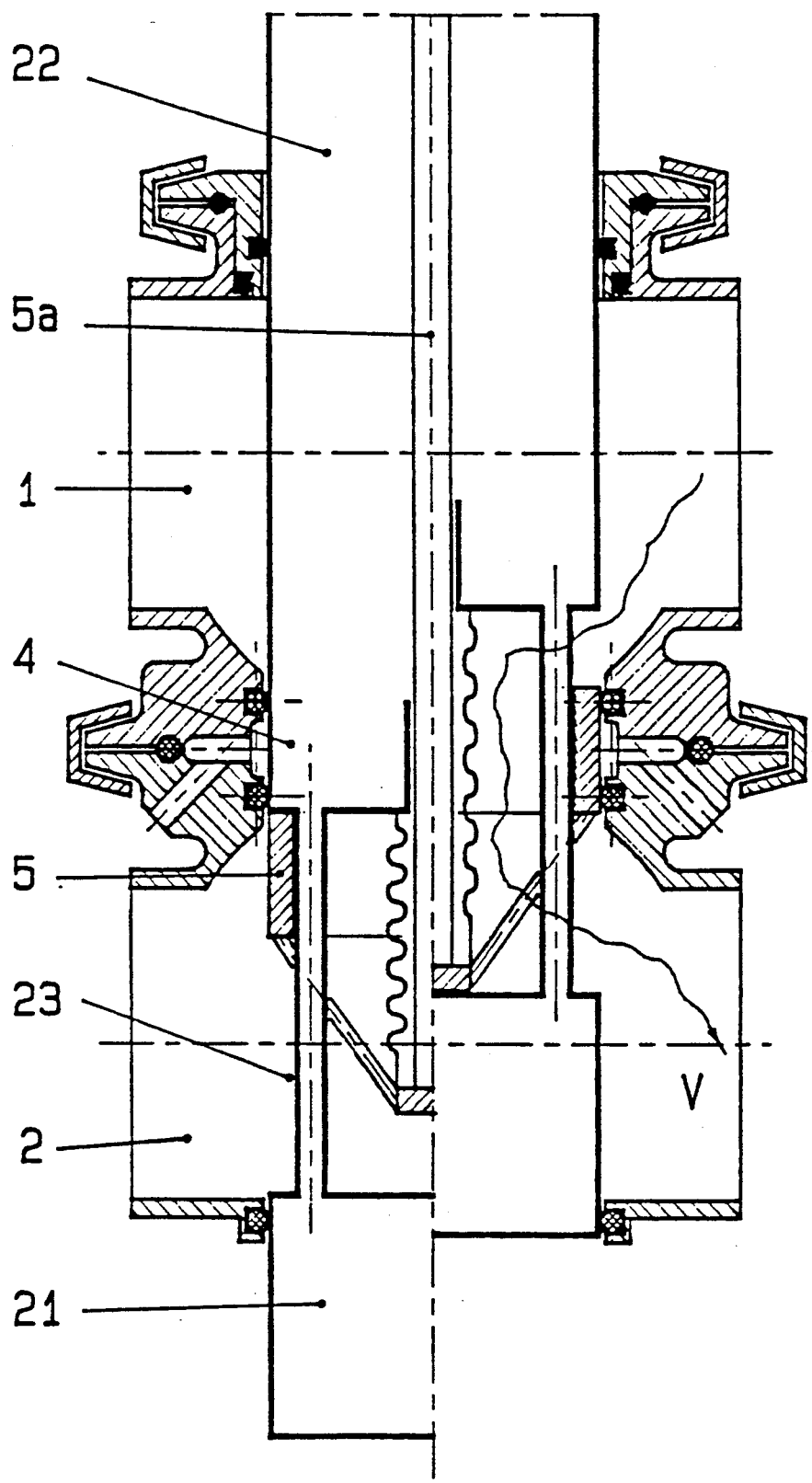
Figures 57, 58:
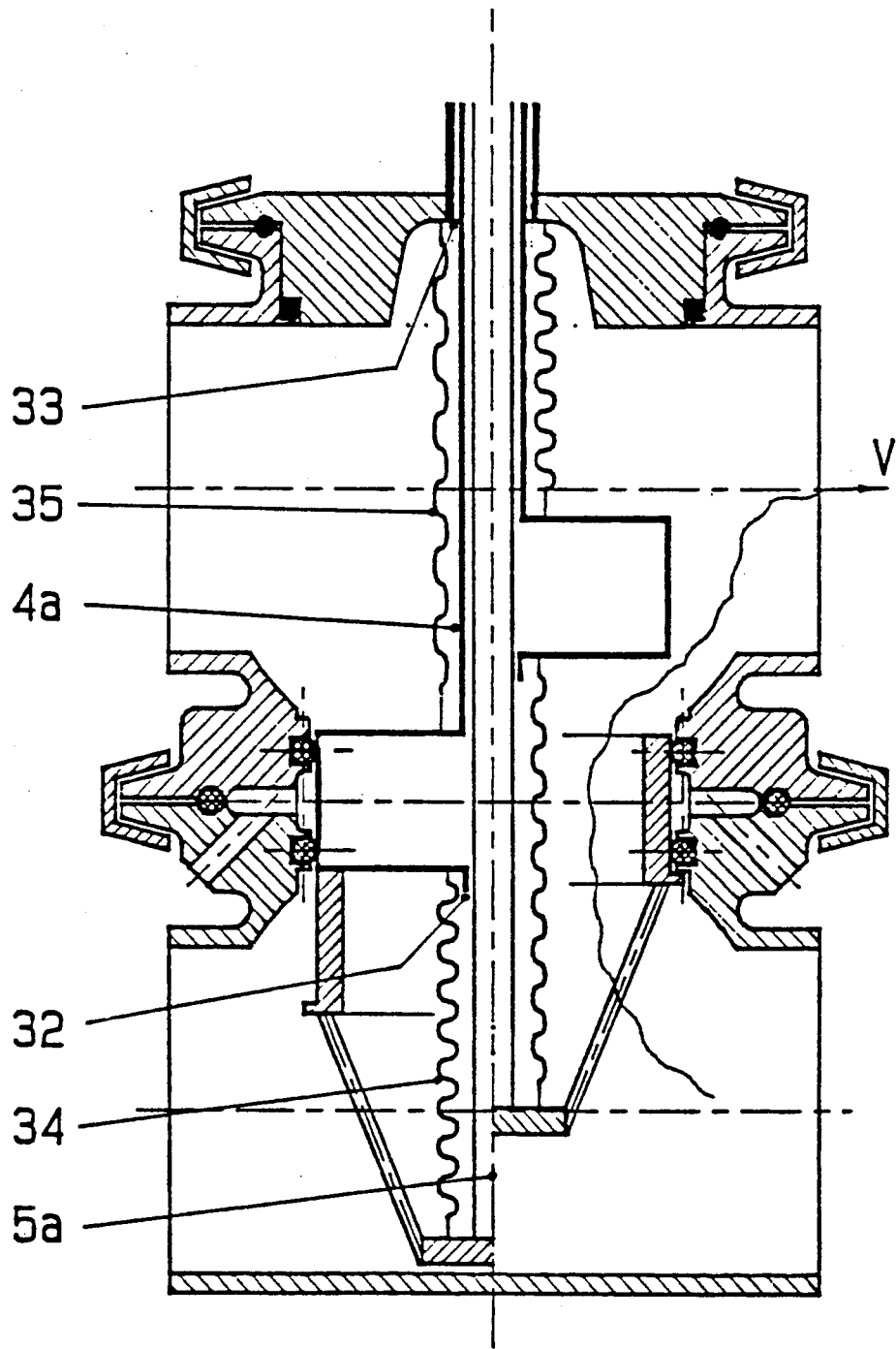
Figure 59:
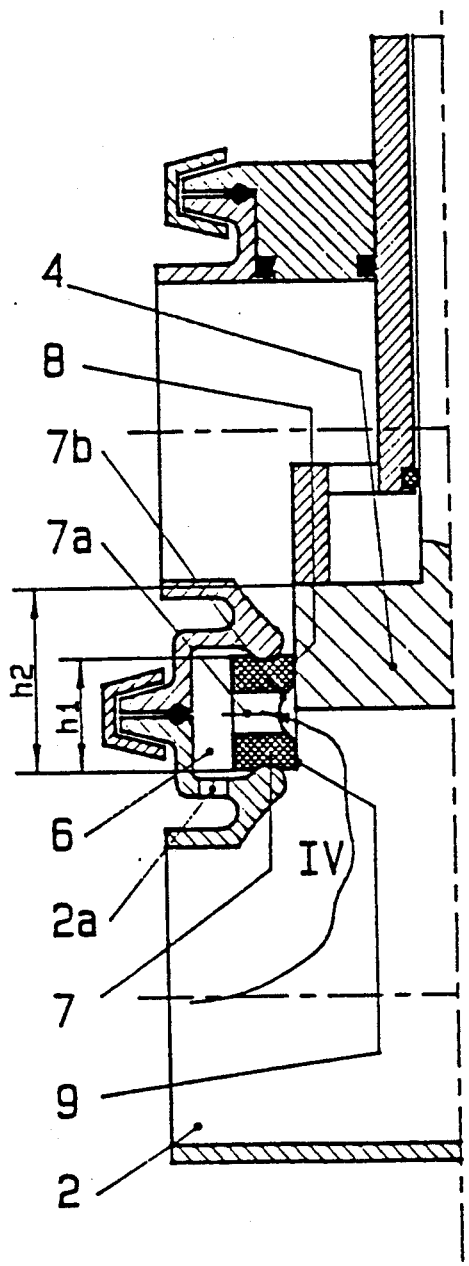
Figure 60:
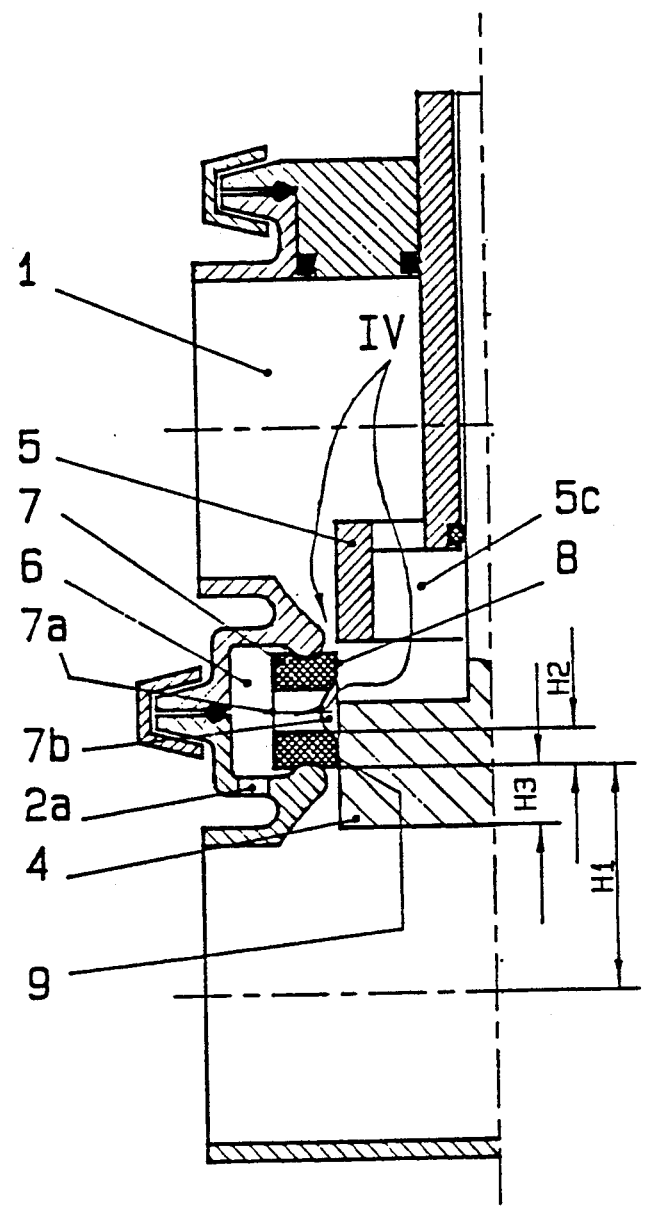
Figure 61:
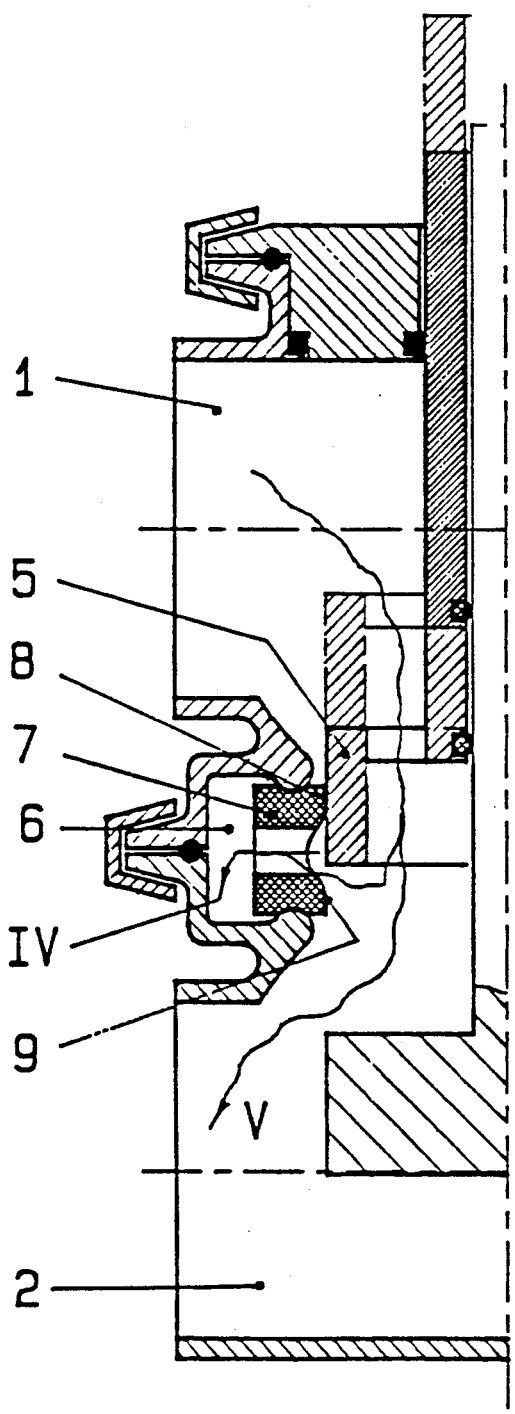
Figure 62:
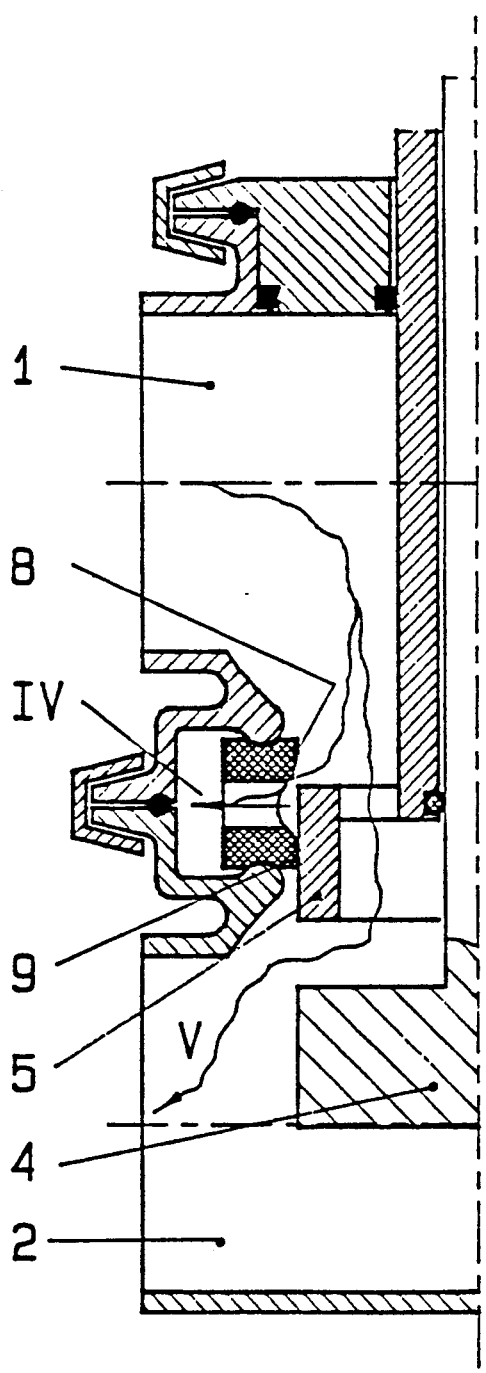
Figures 63, 64:
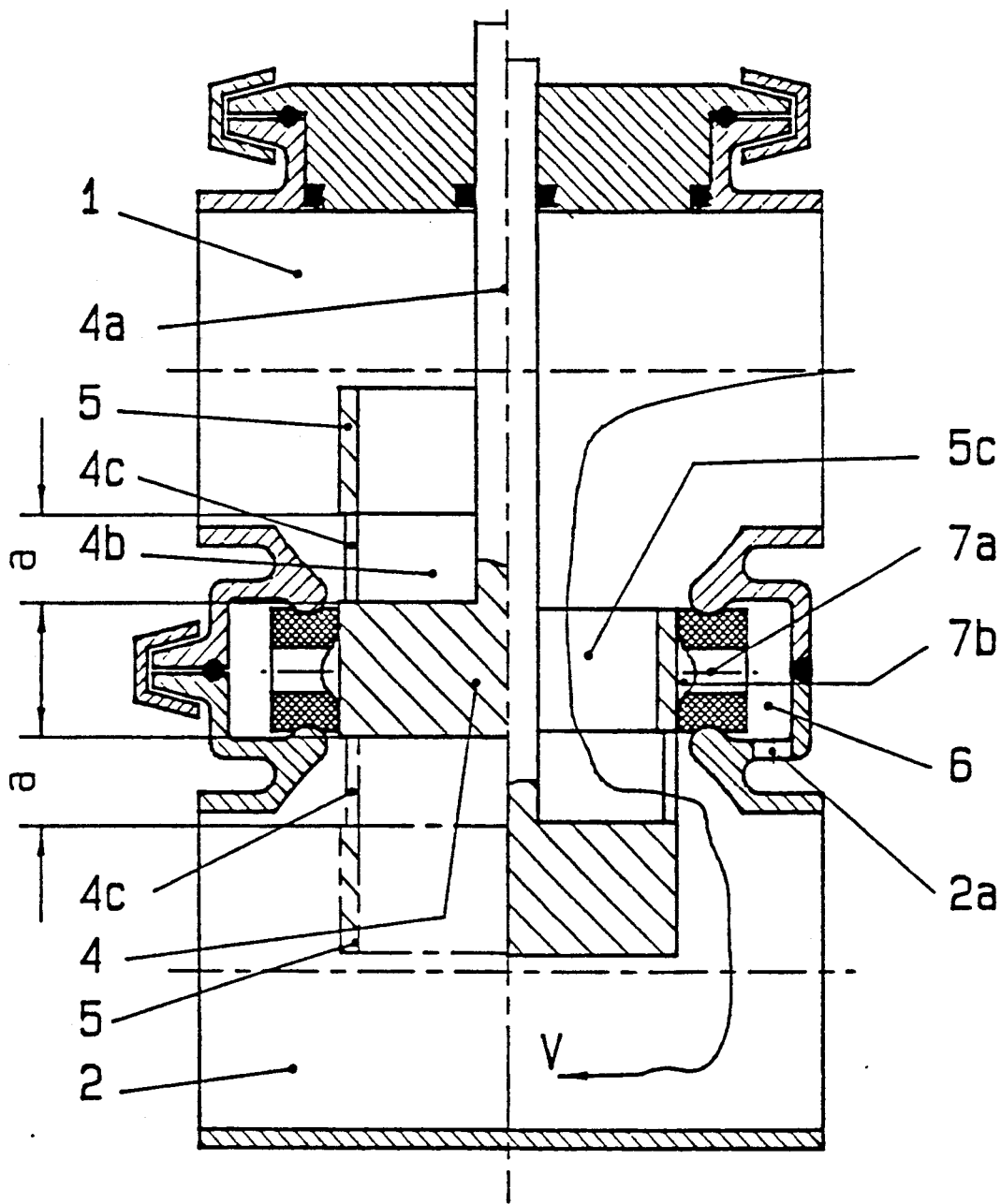

FIG. 50—an embodiment according to FIG. 35, wherein at the closing member there are provided two compensating pistons;

FIG. 51, FIG. 52—an embodiment according to FIGS. 41 to 43, the left-hand side illustration showing the valve in its closed position and the right-hand side illustration the valve in its open position, the stem of the locking piece being fitted within the closing member with a drive piston;

FIG. 53, FIG. 54—a center section through another embodiment of the apparatus according to the invention as is derived from FIGS. 9 to 12;

FIG. 55, FIG. 56—an embodiment according to FIGS. 53 and 54, with a compensating piston on both sides of the closing member;

FIG. 57, FIG. 58—a further embodiment according to FIGS. 53 and 54, with the solution by bellows for both stems;

FIG. 59, FIG. 60—a center section through the embodiment according to FIGS. 1 to 4, wherein FIG. 59 shows the seat cleaning position for the bottom sealing place and FIG. 60 that for the upper one in the closed position of the valve;

FIG. 61, FIG. 62—a center section through the valve according to FIGS. 59 and 60 showing the two seat cleaning positions in the open position of the valve;

FIG. 63, FIG. 64—a center section through an embodiment of the apparatus according to the invention in the closed or open position, respectively, the locking piece—both alternatives of the arrangements of closing member being shown in FIG. 9—being firmly attached to the closing member at a distance.

Figures 65, 66, 67:
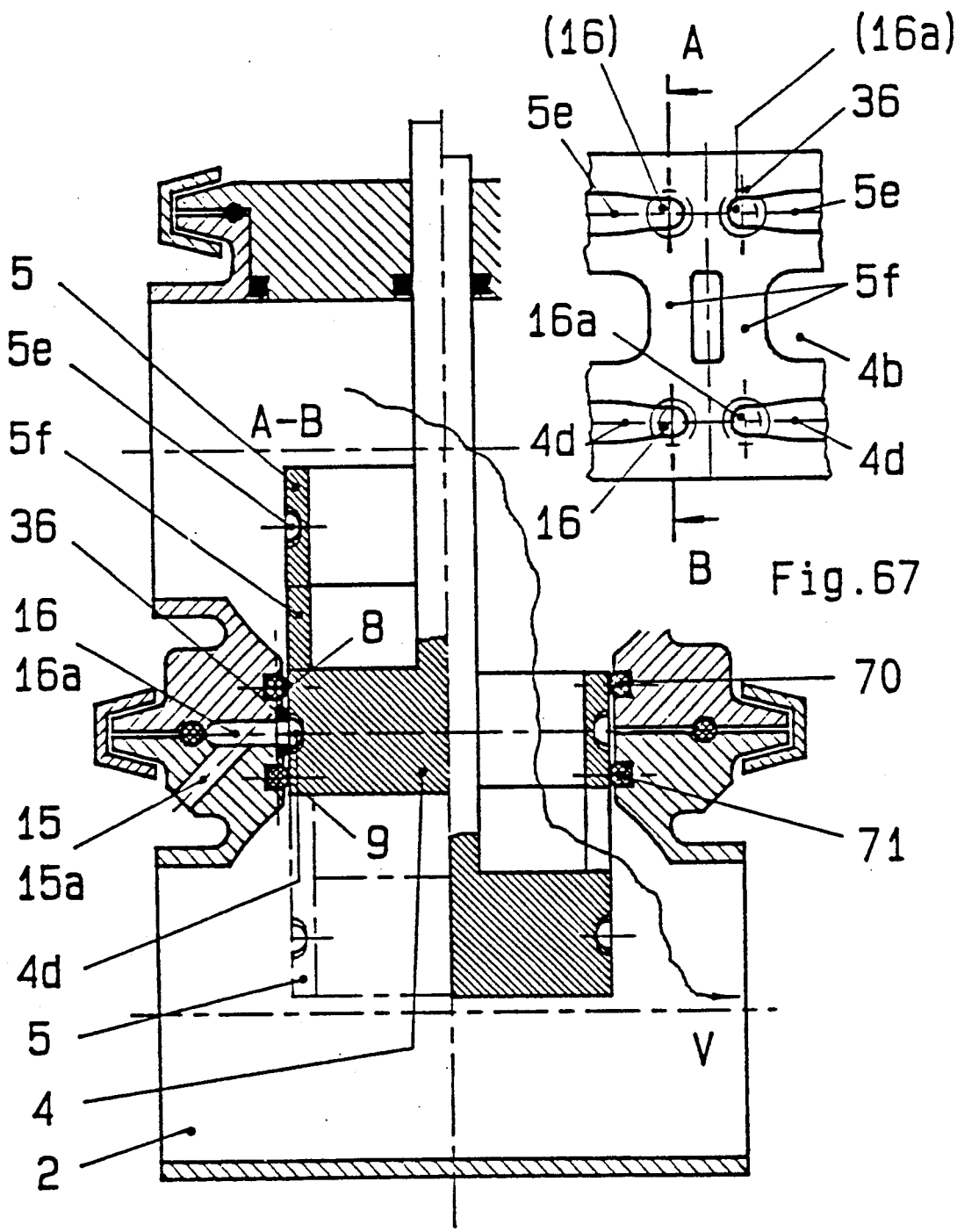
Figure 68:
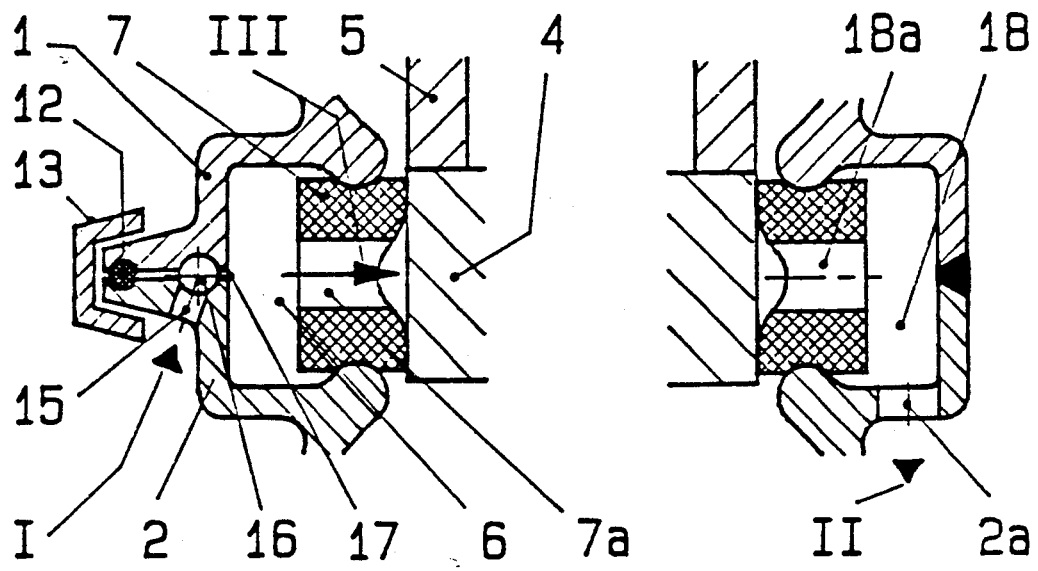
Figure 69:
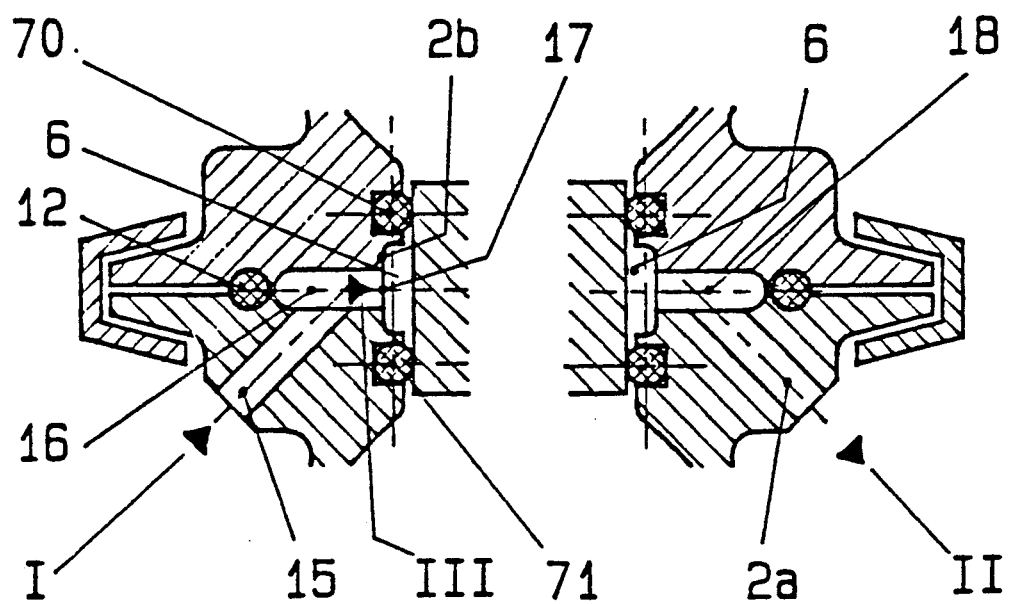

FIG. 65, FIG. 66—a center section through a modified embodiment according to FIGS. 63 and 64 with a control ridge between closing member and locking piece;

FIG. 67—a cutaway illustration of the view of the closing member and the locking piece for the characterization of the course of the section underlying FIGS. 65 and 66;

FIG. 68, FIG. 69—a center section through the apparatus according to the invention in the region of the leakage cavity and the adjacent valve casing connection as it is disclosed in FIGS. 1 to 64;

FIG. 70, FIG. 71—a center section through another embodiment of the apparatus according to the invention, both the closing member and the locking piece being designed as rotary slide valves and firmly attached to one another (closed position: FIG. 70; Open position: FIG. 71);

FIG. 72, FIG. 73—a center section through a further embodiment of the apparatus according to the invention, the closing member and the locking piece being designed as rotary slide valves and disposed relatively movable in respect of one another (closed position: FIG. 72; open position: FIG. 73);

FIGS. 74 to 77—a center section each through an advantageous embodiment of an apparatus for cleaning a dynamically loaded seal assembly of a valve (FIG. 74), wherein the regions in question are shown enlarged in the FIGS. 75 to 77;

FIGS. 78 to 81—a center section through another advantageous embodiment of an apparatus for cleaning a dynamically loaded seal assembly of a valve (FIG. 78), wherein the casing seal is accessible and replaceable from the inside space of the valve, and wherein the details of the arrangement are shown enlarged in FIGS. 79 to 81.

In the following list there are indicated the terms used in the following descriptions of FIGS. 1 to 81.

LIST OF TERMS

| LIST OF TERMS | |
| --- | --- |
| 1, 2 | Valve casing parts |
| 2a | Drain outlet |
| 2b | Recess in the casing |
| 3 | Casing closing part |
| 4 | Closing member |
| 4a | Stem (Rotary axis, FIGS. 70 to 72) |
| 4b | Apertures |
| 4c | Connection ridges |
| 4d | Groove in closing member |
| 4e | Spring support |
| 4f | Closing member boundary surface |
| 4g | Drive chamber |
| 5 | Locking piece |
| 5a | Stem |
| 5b | Ridges |
| 5c | Passage opening |
| 5d | Stop |
| 5e | Groove in locking piece |
| 5f | Control Ridge |
| 5g | Drive piston |
| 5h | Piston seal |
| 6 | Leakage cavity |
| 7 | Seal |
| 70 | First seal |
| 71 | Second seal |
| 7a | Connection conduits |
| 7b | Groove in seal |
| 8 | First sealing place |
| 9 | Second sealing place |

-continued

LIST OF TERMS

| | |
|---|---|
| 10 | Inner stem seal |
| 11 | Outer stem seal |
| 12 | Casing seal |
| 13 | Connection means |
| 14 | Material-closed connection |
| 15 | Connection port |
| 15a | Second connection port |
| 16 | Conduit |
| 16a | Second conduit |
| 17 | Discharge mouth |
| 18 | Main drain |
| 18a | Upstream collection channel |
| 19 | Circular gap |
| 20 | Spring |
| 21 | First compensating piston |
| 22 | Second compensating piston |
| 23 | Connection piece |
| 24 | Connection traverse |
| 25 | Actuation rod |
| 26 | First bellows |
| 27 | Second bellows |
| 28 | Third bellows |
| 29 | First penetration site |
| 30 | Second penetration site |
| 31 | Third penetration site |
| 32 | Fourth penetration site |
| 33 | Fifth penetration site |
| 34 | Fourth bellows |
| 35 | Fifth bellows |
| 36 | Seal |
| 37 | Disk |
| 37a | Separating wall |
| 37b | First by-pass conduit |
| 38 | Annular space |
| 38a | Penetration gap |
| 39 | First deflector |
| 39a | Conduit |
| 40 | Second deflector |
| 41 | Boundary wall |
| 42 | First recess |
| 43 | Second recess |
| 44 | First annular space |
| 45 | Second annular space |
| 46 | Retaining ring |
| 46a | First spacer |
| 46b | Second spacer |
| 47 | Second by-pass conduit |
| 48 | Pressure means inlet |
| I | Inlet of cleansing fluid |
| II | Outlet of cleansing fluid/leakage |
| III | Jet of cleansing fluid |
| IV | Flow of seat cleaning |
| V | Passage or pipe flow |
| a | Distance |
| a* | First rotary path |
| b* | Second rotary path |
| β | Direction of opening movement |
| h1 h2 H1 H2 H3 | Lengths of travel |

FIGS. 1 to 4, 5 to 8, 9 to 12, and 13 to 16 show the four fundamentally possible configurations of closing member 4 and locking piece 5 within the valve casing parts 1, 2. A leakage cavity 6 is located on the side of the casing between the valve casing parts 1 and 2. The two sealing places 8 and 9 are associated neither to the casing 1 or 2 nor to the closing member 4 in the drawing. In the configurations according to FIGS. 1 to 4 and 9 to 12, the stems 4a, 5a point in one direction, in the configurations according to FIGS. 5 to 8 and 13 to 16, the stems are led out of the valve casing 1 or 2 in opposite directions. FIGS. 1, 5, 9 and 13 each show the closed position of the valve, in which the locking piece 5 forms a gap 19 with the closing member 4, the FIGS. 4, 8, 12 and 16 each show its open position. The FIGS. 2, 6, 10 and 14 show the valve in a so-called "pick-up position", in which the closing member 4 bridged the gap 19 and the FIGS. 3, 7, 11 and 25 show the valve in an intermediate position, in which the locking piece 5 completely locked the connection between the leakage cavity 6 and the inside space of the valve casing parts 1, 2, and the closing member 4 just separated itself from the locking piece 5.

In the FIGS. 17, 18, 19 and 20, there are shown in detail the configurations according to FIGS. 1 and 4 in the closed, pick-up, intermediate and open positions. The valve casing parts 1, 2 are for instance interconnected by suitable connection means 13 (FIG. 17), interposing a casing seal 12. In the region of their connection pieces the valve case parts 1, 2 are so configurated that they define in combination with a seal 7 a leakage cavity 6, which is disposed as circular annular space around seal 7.

On the side of the seal 7 facing the valve interior there are located a first and a second sealing place 8 or 9, respectively, between which there is provided an annular groove of the seal 7b open towards the inside space of the valve casing 1, 2. The said groove comprises expediently several connection conduits 7a distributed over the circumference of seal 7, which connect the groove in the seal 7b with the leakage cavity 6. A closing member 4 designed as slide is in the closed position of the valve (FIG. 17) within seal 7 and forms with it the first and the second sealing place 8 or 9, respectively. Above closing member 4 there is disposed locking piece 5 configurated as cylindrical annular body, said locking piece 5 being connected via ridges 5b with a stem 5a and forming with closing member 4 a circular gap 19. The stem 5a is sealed by means of a steam seal 11 against a stem 4a provided for actuating the closing member 4 and at the same time expediently conducted on the latter. Both stems 4a, 5a are led out in one direction from valve casing part 1 through a casing closing part 3. Sealing of stem 5a in the casing closing part 3 is effected by an interior stem seal 10; casing closing part 3 and valve casing part 1 are sealed against each other by a casing seal 12. The locking piece 5 has in respect of the sealing places 8, 9 the appropriate shape and the dimensions of the closing member 4, and a passage opening 5c between the ridges 5b expediently has a cross-section corresponding to the nominal cross-section of the valve. In the shown closed position of the valve the overflow of fluids from the valve casing part 1 into the valve casing part 2 or vice versa is prevented by the two sealing places 8 and 9. Should leakage occur at the sealing places 8, 9, then it will arrive in the groove of the seal 7b and will be discharged via the upstream collecting channels 18a and the main drain 16 into the leakage cavity 6.

From there it can flow out via a drain outlet 2a (FIG. 18) to the environs of the valve.

Figures 17, 18:
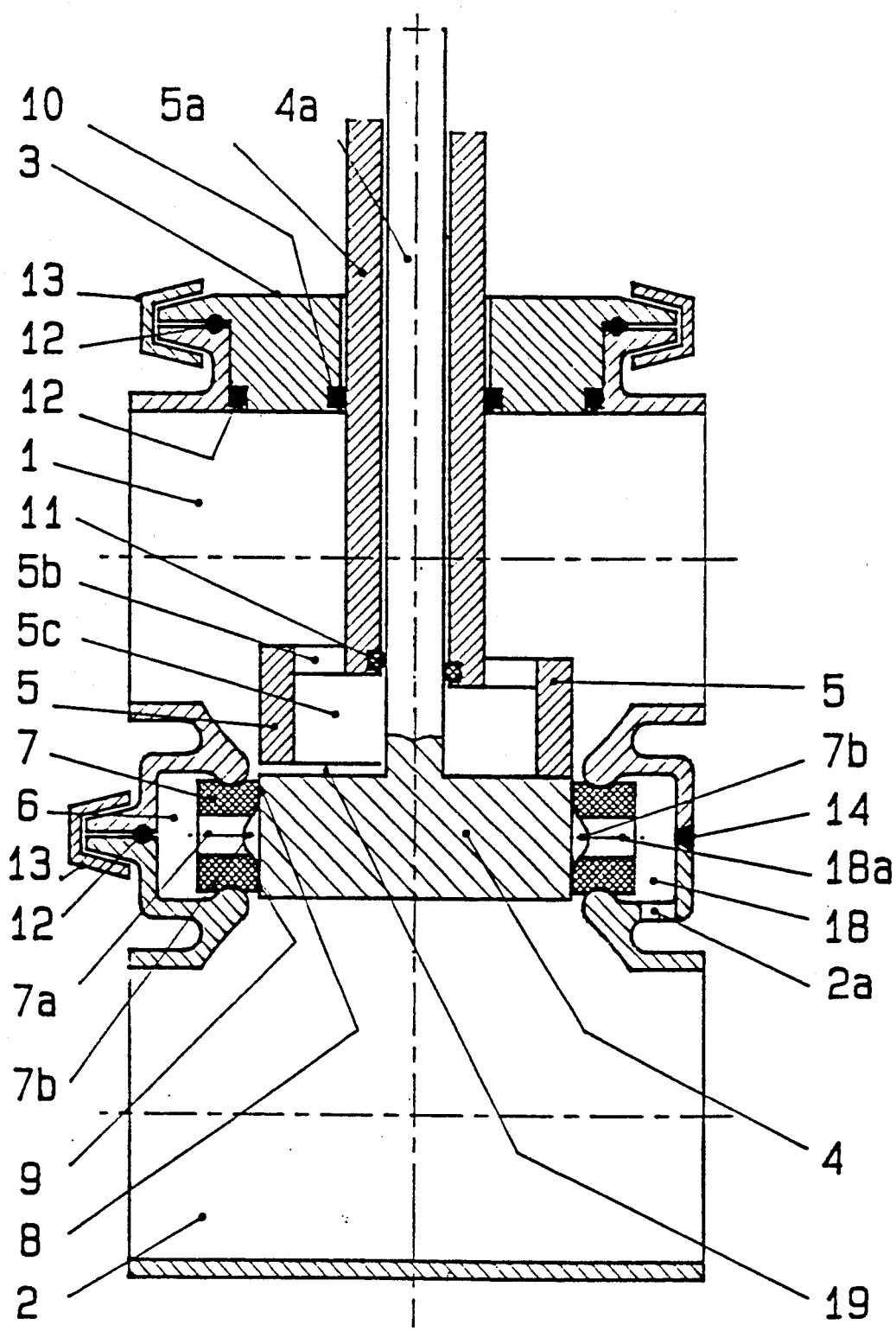

In the so-called "pick-up position" (FIG. 18) the locking piece 5 bridged the gap 19 and achieved abutment at closing member 4. From this position both closing member 4 and locking piece 5 jointly proceed to the intermediate position described below. As an alternative to the connection of the valve casing parts 1, 2 with connection means 13 there is shown in FIG. 18 a material-closed connection 14 (welding).

Figures 19, 20:
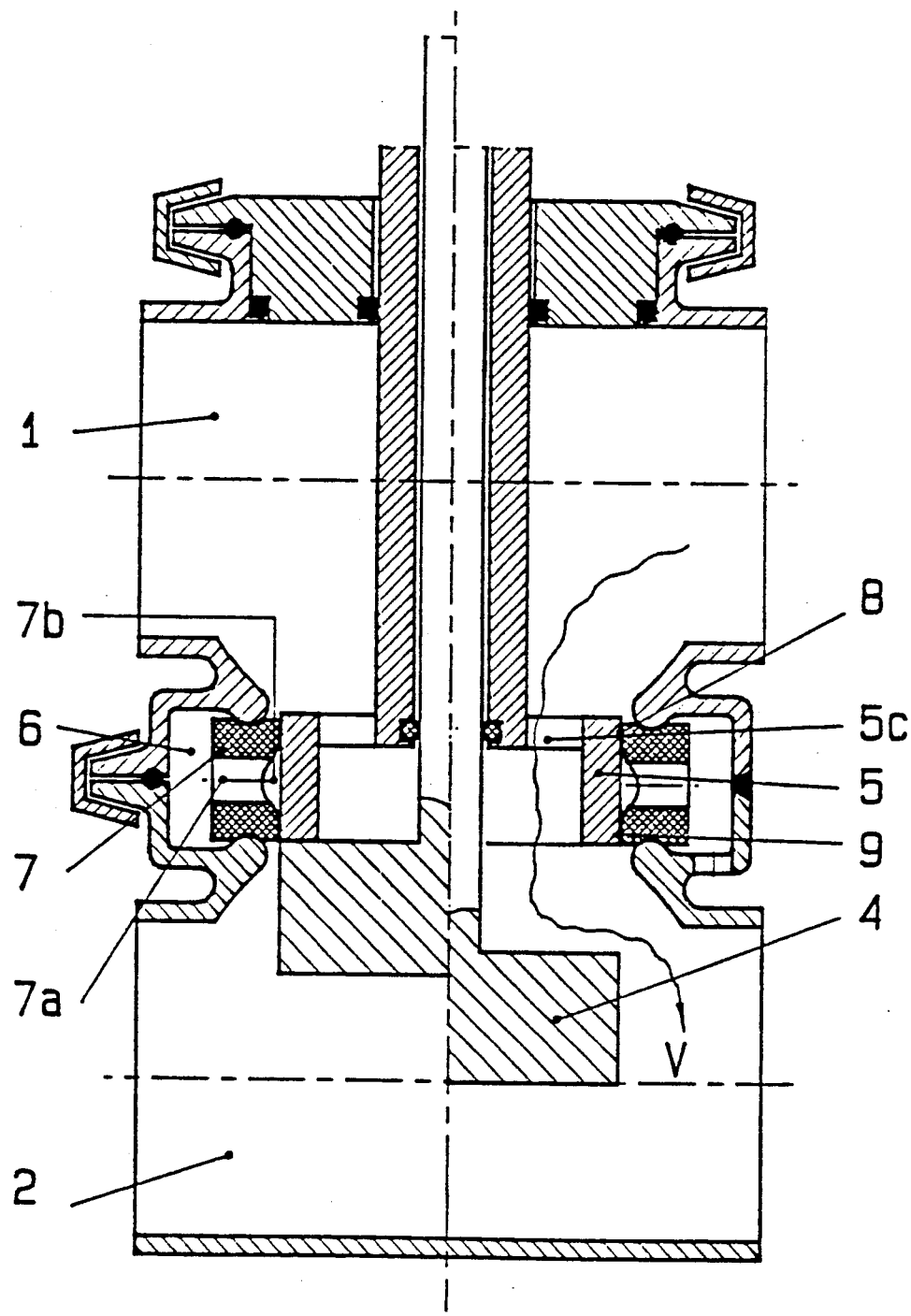

FIG. 19 shows the intermediate position of the valve already explained above. The locking piece 5 on its course to the shown intermediate position completely assumed the position of closing member 4 in its closed position and pick-up position within the annular seal 7 Since the locking piece 5 and the closing member 4 on their course to the shown position always sealingly contact each other, no fluid present in valve casing part 1 can leak into the groove of the seal 7b and thus via the connection conduits 7a into the leakage cavity 6. The switching step up to this position is leakage-free.

On the way of closing member 4 to its fully open position (FIG. 20) there does not occur any switching leakage, either. The locking piece 5 stays in its position within seal 7 and thus durably locks via sealing places 8, 9 the connection between the leakage cavity 6 and the inside space of the valve casing parts 1, 2. In the fully open position of the valve the distance between the closing member 4 and the locking piece 5 is so dimensioned that the usable passage cross-section for passage or pipe flow V expediently corresponds to the nominal cross-section of the valve. The closing movement of the valve proceeds accordingly in reversed sequence; like the opening motion it does not have any switching leakage.

FIG. 21 shows an embodiment of the valve according to the invention in which the sealing places 8, 9 are realized by two separate seals 70, 71. Between the sealing places 8, 9 there is provided a circular groove 2b open towards the inside space of the valve casing 1, 2, which on the side of the valve casing is connected via at least one conduit 16 with a connection port 15, which establishes a connection to the outside of the valve. The recess in the seal 2b constitutes in combination with the closing member 4 the leakage cavity 6; conduit 16 is bordered on either side by the valve casing parts 1, 2 and outwardly sealed by means of casing seal 12 against the environs of the valve. FIG. 21 shows the closed position of the valve. Entry of the cleansing fluid I into the valve is effected via the connection port 15a. The cleansing fluid streams through the leakage cavity 6 and comes, as shown in FIG. 22, showing the open position of the valve, via the main drain 18 and the drain outlet 2a as outlet of cleansing fluid II to the outside of the valve. In the event of a leakage in the seat region it will be drained via the main drain 18 and the drain outlet 2a as discharge of the leakage II to the environs of the valve.

In FIG. 23 is the seal 7 disposed on the side of the closing member or the locking piece, respectively, and enforces as one-piece seal the entire outer surface area of closing member 4 or locking piece 5, respectively, tangent to the sealing places 8 or 9, respectively. For the purpose of forming the leakage cavity 6 there is provided a recess in casing 2b between the sealing places 8, 9. FIG. 23 shows the valve in its closed position, the seal 7 defining in combination with the sealing places 8, 9 and the recess in the casing 2b the leakage cavity 6.

In FIG. 24 showing the open position of the valve described above, the locking piece 5 now forms the leakage cavity 6 in combination with its seal 7 and the above-mentioned recess in the casing 2b. Both in the closed and in the open position of the described valve any leakage can be transferred to the leakage cavity 6 via the sealing places 8, 9 and drained from there to the environs of the valve.

FIG. 25 shows a valve according to FIGS. 1 to 4 in its closed position, wherein on the side of closing member 4 averted from the direction of the opening motion there is disposed a cylindrical first compensating piston 21, the diameter D of which is as equal as possible to diameter D of closing member 4. Both closing member 4 and compensating piston 21 are interconnected by means of a connection piece 23, the diameter d of which is smaller than diameter D of the closing member 4 or the compensating piston 21. The connection piece 23 is disposed outside of the centric region around the axis of symmetry of the closing member 4 so that the stem 5a of the locking piece 5 can be disposed in the axis of symmetry of the closing member 4. The stem 5a is indirectly conducted out of the valve casing part 1 by means of a connection traverse 24 and an actuation rod 25 on the way through the closing member 4 and the connection piece 23 through the first compensating piston 21. The stem 5a supports at its upper end via the downwardly slanting ridges 5b the locking piece 5. The proposed configuration of stem 5a, the ridges 5b, and of locking piece 5 permits a material-closed bridging of the first penetration site 29 formed between stem 5a and the closing member 4 by means of a first bellows 26 in an advantageous manner. For the compensation of pressure impacts opening the closing member 4 the provision of the first compensating piston 21 is adequate.

Pressure impacts in valve casing part 2 do not result in an upward displacement of closing member 4 since the latter is already in its final upper position which is securely restricted by a stop in the drive area not shown in detail. When the closing member 4 is provided beyond a closing member boundary surface 4f with a second compensating piston 22 which is expediently with an equal diameter directly following closing member 4 and led out through the valve casing part 4, closing member 4 in valve casing part 2 can be opening without problems against incompressible media and/or pressure impacts in this region obstructing the opening are compensated free of the effects of pressure forces. FIG. 26 is showing the valve described above in its open position. The passage or pipe flow V comes from valve casing part 1 into the valve casing part 2 and in doing so flows around the first bellows 26 in its stretched and hence easy-to-service configuration.

The embodiment of the valve according to FIG. 27 differs from that according to FIG. 25 merely in that the stem 5a of locking piece 5 is led out of the valve casing part 1 directly through the first compensating piston 21. The first penetration site 29 between rod 5a and the compensating piston 21 is bridged material-closed by the first bellows 26, which, as is evident in the open position of the valve according to FIG. 28, achieved its shortest configuration. The remaining structure of the instant valve is identical to that according to FIG. 25; consequently a description in this respect is superfluous.

The embodiments of a valve shown in FIG. 29 (closed position of the valve) and FIG. 30 (open position of the valve) are in their fundamental structure identical to that according to FIG. 27. The difference resides in that a second and a third penetration site 30 and 31 between the first compensating piston 21 or the second compensating piston 22 are each bridged material-closed by a second bellows 27 or a third bellows 28. By an indentation in the first compensating piston 21, not shown in detail, for the displacement of the connection point of the bellows enclosing the stem of the locking piece, its stretching ratio can be influenced favourably.

FIG. 31 is showing an embodiment of the valve according to the FIGS. 1 to 4 in the specific configuration according FIGS. 21 or 17, respectively. The outer stem seal 11 in the latter embodiments, which must be considered critical, is bridged material-closed in the embodiment according to FIG. 31 at a fourth penetration site 32 between the stem 4a and stem 5a by means of a fourth bellows 34. For this purpose the linking point of bellows 34 at the stem 5a is moved by a specific shaping of the ridges 5b of the locking piece 5 upwardly as far as possible to allow the bellows 34 to work at a favourable stretching ratio. In FIG. 32 there is shown the arrangement described above in its open position. It is shown that the passage or pipe flow V meets a bellows 34 at its greates elongation possible, thus providing advantageous cleaning conditions in said area.

In FIGS. 33 and 34 is illustrated an embodiment of a valve which in its basical structure is identical to that according to FIG. 31. It differs from the latter in that a fifth penetration site 33 between the stem 5a on the side of the casing and the valve casing part 1 is bridged material-closed by a fifth bellows 35. The shown valve thus no longer comprises dynamically loaded seals in the penetration areas of stems 4a, 5a. It is therefore especially suited for utilization in the aseptic field. From the open position shown in FIG. 34 it is evident that both bellows 34 and 35 in this position have their maximum elongation. This is expediently dimensioned so that their tension-free elongation is reached in an intermediate position between the closed position shown in FIG. 33 and the open position shown in FIG. 34.

FIGS. 35 to 46 illustrate the four fundamentally possible configurations of closing member 4 and locking piece 5 within valve casing parts 1, 2, as had already been shown in FIGS. 1 to 18 above. The difference over the former forms of embodiment of the valves resides in that only the stem 4a of the closing member 4 is led out from valve casing part 1 or 2, respectively, and that the locking piece 5 is guided in or at closing member 4, in that a spring 20 is provided between closing member 4 and locking piece 5 (cf. FIG. 47) or between the valve casing parts 1, 3 or 2, respectively, and the locking piece 5, which causes the locking piece 5 to be taken along by closing member 4, or a movement of locking piece 5 with the latter effect, and in that a stop 5d is provided at locking piece 5, which limits its movement beyond the seat area of the valve. The spring 20 can prop itself directly either on valve casing part 1 or 3 (FIG. 35) or at valve casing part 2 (FIG. 41). The same effect of the spring 20 on the locking piece 5 is substantially equally achieved according to an embodiment according to FIG. 47, in which spring 20 is supported against a spring support 4e on stem 5a. It is in addition shown that the gap 19, as is existing between closing member 4 and locking piece 5 in the closed position of the valve according to the embodiments of FIGS. 1, 5, 9 and 13, cannot be realized in the embodiments according to FIGS. 35 to 47. The spring 20 both in the pick-up and the intermediate position always presses the locking piece 5 against the closing member 4. This fact on the one side permits a very simple drive but on the other side requires additional measures as are described hereinafter, should the gap 19 mentioned above be necessary in the embodiments according to FIGS. 35 to 47.

FIG. 48 illustrates in more detail an embodiment of the valve according to FIG. 47 as regards the relevant area of valve casing part 1. It is evident that the locking piece 5 is guided via the ridges 5b on the stem 4a of the closing member 4. The spring 20 supports itself on the one side via the ridges 5b on locking piece 5 and on the other side via the spring support 4e on stem 4a. The stop 5d is provided on locking piece 5 to restrict the locking piece 5 from being taken along beyond its seat region.

FIG. 49 shows a partial area of valve casing part 1 of a further embodiment of the valve according to FIG. 35. Here the spring 20 supports itself on the one side, as in the embodiment according to FIG. 48, on the locking piece 5 and on the other side directly on the casing closing part 3.

FIG. 50 is an embodiment of the valve, in which the embodiment of the valve according to FIG. 48 is modified by the arrangement of the first compensating piston 21 and of the second compensating piston 22. The stem 4a of the closing member 4 equally forms the connection piece between closing member 4 and the first compensating piston 21 and the motion rod for the locking piece 5. It has a diameter d, which is smaller than the diameter D of the closing member 4 or of the compensating piston 21. The spring support 20 is formed by the front-side boundary of the first compensating piston 21. The second compensating piston 22 follows with equal diameter the closing member 4 and is led out through valve casing part 2.

The embodiment of the valve according to FIG. 51 corresponds to that of FIGS. 41 to 43. The locking piece 5 is disposed below the closing member 4, the stem 4a being led out upwardly via the fifth penetration site 33 from valve casing part 1, while the stem 5a penetrates the closing member 4 centrically from below and is guided in it. The stem 5a is at its upper end connected to a drive piston 5g, which is sealingly conducted within the closing member 4 by means of a piston seal 5h and together with closing member 4 being of hollow design defines a drive chamber 4g which is connected with a pressure means inlet 48 via the stem 4a. Spring 20 is supporting itself on the one side on the drive piston 5g and on the other side on an extension of closing member 4, not designated in detail, which is protruding into the valve casing part 2 and simultaneously serves also as guidance for the stem 5a within the closing member 4. In the illustrated embodiment both the fourth penetration site 32 and the fifth penetration site 33 are bridged material-closed by means of the fourth bellows 34 or the fifth bellows 35. In order to ensure a gap 19 between closing member 4 and locking piece 5 in the closed position of the valve the drive chamber 4g is loaded with pressure means via pressure means inlet 48 so that the locking piece 5, which at first remains pressed to closing member 4 under the influence of spring 20, is displaced away from the closing member 4 to form the gap 19 shown in the drawing. In the open position of the valve shown in FIG. 52 the triggering of the drive chamber 4g with pressure means can be omitted since the passage gap between closing member 4 and locking piece 5 is causally effected by the opening force applied via stem 4a and the simultaneous restriction of the lift of locking piece 5 by its stop 5d.

In FIG. 53 the embodiment according to FIGS. 9 to 12 is illustrated in greater detail. The locking piece 5 is, however, now located below the closing member 4, and the stem 5a required for its actuation is conducted through the stem 4a designed as hollow rod of closing member 4. In its further structure the shown valve corresponds to that according to FIG. 17; a detailed description is therefore superfluous. While FIG. 53 shows the closed position of the valve discloses FIG. 54 its full open position. The passage flow V comes here from the valve casing part 2 via a passage opening 5c within the locking piece 5 into the valve casing part 1. The embodiment according to FIG. 53 achieves in view of that according to FIG. 17 shorter stems 4a, 5a; owing to this there is possible a preciser guidance of both the closing member 4 and the locking piece 5.

In FIGS. 55 and 56, an embodiment of the valve according to FIGS. 9 to 12 is equipped on either side of the closing member 4 with the compensating piston 21, which by means of connection piece 23 is connected with the closing member 4, and the second compensating piston 22, which adjoins directly and with equal diameter closing member 4. The stem 5a of the locking piece 5 is conducted centrically through the closing member 4, its penetration site formed with the closing member, not designated in detail, being bridged material-closed by bellows, not designated in detail as well. The open position of the valve illustrated in FIG. 56 shows that the bellows has in this position its greatest elongation possible and consequently is accessible to the passage or pipe flow V for easy cleaning.

FIGS. 57 and 58 show the embodiment of a valve according to FIGS. 9 to 12. The configuration of the closing member and the arrangement of stem 5a for actuating the locking piece 5 is identical to that of FIG. 55. In addition to the material-closed bridging of the fourth penetration site 32 by means of the fourth bellows 34, there is also bridged material-closed the fifth penetration site 33 formed between the stem 4a of the closing member 4 and the casing by means of the fifth bellows 35. This embodiment has, like that according to FIG. 51, on either side of closing member 4 each one bellows 34 or 35, respectively, wherein the fifth bellows 35 in the closed position and the fourth bellows 34 in the open position (cf. FIG. 58) of the valve have their respective maximum elongation. The bellows 34 and 35 are expediently so dimensioned that they achieve their tension-free starting length in a position between the closed and the open position of the valve. By an appropriate design of the drive of the valve, not shown in detail, it is possible, just as in the embodiment according to FIG. 55, to ensure the gap below the closing member 4 which is necessary for the prevention of a dome. The shown embodiment of the valve reveals particular suitability for the utilization in the aseptic field.

In FIG. 59 the embodiment of the valve according to FIG. 17 is shown in its so-called seat cleaning position. The closing member 4 is here positioned in a closed position of the valve in such a manner that only the sealing place 8 is existing and the sealing place 9 which is exposed by the partial lift of closing member 4 is connecting the leakage cavity 6 to the valve casing part 2 adjacent to the exposed sealing place 9. A flow of seat cleaning IV comes from the valve casing part 2 through the gap between the closing member 4 and the seal 7 into the groove of seal 7b and from there through the connection conduits 7a into the leakage cavity 6, to drain then through the collecting drains 18, 18a and the discharge outlet 2a to the outside of the valve (cf. FIG. 18). The discharge outlet 2a is shown in FIG. 59 incorrect as to its position. In addition, in FIG. 59 there are indicated the lifts h1 and h2. The former represents the lift of locking piece 5 from the open into the closed position of the valve. The latter indicates the total lift of locking piece 5 from the open position into the shown seat cleaning position.

FIG. 60 shows the seat cleaning position for sealing place 8. In this position the seat cleaning flow IV comes from valve casing part 1 both through the passage opening 5c within the locking piece 5 and from the region outside of locking piece 5 into the groove in seal 7b and from there on the way described above into the outside of the valve. The indication of lifts H1, H2 and H3 is to show which adjustment possibilites are to be provided on the side of the drive in respect of closing member 4. Lift H1 represents the axial movement of closing member 4 from its closed into its full open position. Lift H2 indicates its displacement into the seat cleaning position for the sealing place 9, Lift H3 that to the seat cleaning position for the sealing place 8. The gap not indicated in detail between the locking piece 5 and the seal 7 ensures that the cleansing fluid can be exchanged also outside of locking piece 5 in the course of the seat cleaning.

The valve according to the invention permits also the seat cleaning described above by displacing the locking piece 5 from its closed position into one or the other direction. In FIG. 61 there is shown the cleaning of the sealing place 9, in which the locking piece 5 is displaced by a partial lift in direction of the valve casing part 1, whereby the sealing place 9 but not the sealing place 8 is exposed. In this position the passage and pipe flow V can pass from valve casing part 1 into valve casing part 2 or vice versa. A partial stream, the so-called flow of seat cleaning IV, passes through the gap between the locking piece 5 and the seal 7 into the leakage cavity 6 to clean in the course thereof all of the exposed sealing surfaces and the leakage cavity. FIG. 62 shows the cleaning of sealing place 8, the locking piece 5 being displaced by a partial lift in the direction of the valve casing part 2.

The explanation in respect of FIG. 61 is applicable accordingly to FIG. 62 as well, wherein, however, for the passage or pipe flow V between locking piece 5 and closing member 4 there is no longer available the full cross-section corresponding to the nominal cross-section of the valve.

The embodiment of the apparatus according to FIGS. 63 and 64 differs from that according to FIGS. 17 or 53, respectively, in that the locking piece 5 is firmly fixed to closing member 4 at a distance a and that the usable cross-section of the apertures 4b between the closing member 4 and the locking piece 5 corresponds expediently to the nominal cross-section of the valve.

In FIG. 63 there are shown the two possible alternatives for the location of the locking piece 5. Several connection ridges 4c distributed over the circumference of locking piece 5 realize the firm attachment indicated above. In the shown embodiment there is only stem 4a of closing member 4 led out of the valve casing part 1. While FIG. 63 shows the closed position of the valve FIG. 64 shows its open position.

The passage or pipe flow V passes from the valve casing part 1 through the passage opening 5c and the effective apertures 4b between locking piece 5 and closing member 4 between ridges 4c to the valve casing part 2. The switching process between closed and open position of the valve or in the reversed sequence is not leakage-free, as there exists an intermediate position, in which there is given a connection between the groove of the seal 7b and the inside space of the valve casing owing to apertures 4b. The remaining structure of the shown valve does not differ from the embodiments described in the foregoing so that a detailled description is superfluous.

The embodiment according to FIG. 65 corresponds in respect of the basic configuration of closing member 4 and locking piece 5 to the embodiment shown in FIG.

63, however, in contrast to the embodiment of FIG. 63 there are provided a groove in closing member 4d and a like groove in locking piece 5e. A cutaway view of closing member 4 and locking piece 5 according to FIG. 67 shows that the above indicated grooves 4d or 5e, respectively, are interrupted at their circumferences in the same manner. The section through closing member 4 and the locking piece 5 shown in FIG. 65 corresponds to the course of section A—B indicated in FIG. 67. Between the sealing places 8, 9 a conduit 16 and a second conduit 16a open side by side but separately from one another into the inside space of valve casing parts 1, 2, the conduits 16 and 16a being connected with the environs of the valve by means of connection ports 15 or 15a, respectively. The closing member 4 or the locking piece 5, respectively, corresponds with conduit 16 and the second conduit 16a in such a manner that the one end of the groove 4d is in direct contact only with conduit 16 and the other one only with the second conduit 16a. The same is applicable regarding groove 5e in the closed position of locking piece 5. In the direction of the switching travel of closing member 4 there is provided between the respective ends of the grooves 4d and 5e a control ridge 5f which is of equal height with the surface area of closing member 4 and locking piece 5, which control ridge 5f sealingly closes during the switching travel the mouth of conduit 16 and that of the second conduit 16a by means of a seal 36 each, which is disposed on the front-side end of conduits 16 and 16a. In the closed position of the valve (cf. FIG. 65) a possibly occurring leakage at the sealing places 8 or 9 can be collected through the groove in the closing member 4d into leakage cavity 6 and drained for instance through the second conduit 16a and the second second connection mouth 15a to the environs of the valve.

In this position there is also feasible a cleaning of the leakage cavity and of the adjacent seals 70, 71, in that, for instance, the cleaning fluid is supplied through the connection port 15 and the conduit 16 and drained through the second conduit 16a and the second connection port 15a. The spaces of the seals 70 and 71 and the dimensions of the closing member 4, the locking piece 5 and the groove 4d or 5e are mutually mated so that during the opening motion of the valve at first conduits 16, 16a are sealed by the control ridge 5f before the seal 71 is left by closing member 4. During the travel to the open position the above-named conduits 16 and 16a remain closed by means of the control ridge 5f until the seals 70 and 71 on either side of the groove 5e have reached abutment at locking piece 5. Also in the open position of the valve, which is shown in FIG. 66, the leakage cavity formed by the groove 5e is provided with an input from or an outlet, respectively, to the outside of the valve. The locking piece 5, just as in the embodiment according to FIG. 63, can be disposed also in the area of valve casing part 2 at the closing member 4. The pertinent arrangement is shown in FIG. 65 by dotted lines. The valve described above corresponds in its remaining structure to that according to FIG. 63; a detailed description is therefore superfluous. The valve permits a limited-leakage switching, although requiring to renounce to the highest standard of safety possible. The said safety restriction is caused by the fact that during the switching travel there can be present cleansing fluid under pressure in one of the conduits 16 or 16a.

FIG. 68 shows an advantageous embodiment of the apparatus according to the invention in the area of the leakage cavity 6 and the adjacent connection of valve casing parts 1, 2. In the connection level between the valve casing parts 1 and 2 and between the leakage cavity 6 and the casing seal 12 there is provided the conduit 16, which is bordered on both sides by the valve casing parts 1, 2. The conduit 16 is in one of the valve casing parts 1 or 2 connected by at least one conduit port 15 with the environs of the valve. Towards the leakage cavity 6 the conduit 16 comprises a circumferential connection in form of an annular gap 17 which is designed as jet in such a manner that the cleansing fluid introduced into it through connection port 15 can discharge into the leakage cavity 6. The annular gap or discharge mouth 17 is expediently aligned in such a manner that the circulating jet of cleansing fluid III purposefully flushes the seal 7 and in particular the connection conduits 7a disposed therein. This embodiment permits the cleaning of the valve at any time both in its closed and in its open position in the area of its leakage cavity 6.

The conduit 16 extends over nearly the entire circumference of the leakage cavity 6, whereas a preceding or upstream second collecting conduit 18a and a main drain 18 are connected with a region of the leakage cavity 6 which is not bounded by conduit 16. By the proposed configuration of conduit 16 and main drain 18 it is intended as well as achieved that the cleansing fluid, which passes into the valve via the inlet of cleansing fluid I and leaves it again through the outlet of cleansing fluid II, is uniformly distributed into the leakage cavity 6 and the adjacent sealing areas and from there is properly collected and drained. Through the main drain 18 and second collecting channel 18a as well as the drain outlet 2a there is also effected the discharge of leakage II.

FIG. 69 is showing a further embodiment of the apparatus according to the invention in the area of the leakage cavity 6 and the adjacent connection of the valve casing 1, 2. It differs from that according to FIG. 68 in that as sealing means between the valve casing parts 1, 2 on the one side and the closing member 4 or the locking piece 5 on the other side there are provided two discrete seals 70 and 71. The leakage cavity 6 is solely formed by the recess in the casing 2b between the seals 70 and 71. While the leakage cavity 6 represents a circumferential annular space, the conduit 16 extends nearly over the entire circumference of the leakage cavity 6, wherein the main drain 18 is connected to a region of the leakage cavity 6 which is not bordered by conduit 16. The discharge mouth or discharge mouths 17 are expediently disposed in such a manner that they are partly bordered by the seals 70, 71. In such a manner the cleaning of sealing areas adjacent to the discharge mouths is possible. The discharge mouth 17 can be designed either as a circular annular gap or as more than a discrete geometrically defined aperture or as a plurality of geometrically non-defined apertures. In the latter instance there must be envisaged in the extreme case for instance a roughened or a mosaic or a milled or a microwaved surface which borders with seal 70 or 71. Through the discharge mouths 17 formed between the respective seal 70 or 71 and the adjacent textured surface the cleansing fluid can be uniformly distributed through conduit 16 into the leakage cavity 6, while its draining as a rule is effected through the main drain 18 connected punctiformly on the leakage cavity 6. The remainder of the structure corresponds to that according to FIG. 68 and a further, detailed description is therefore superfluous.

The FIGS. 70, 71, 72, and 73 show that the features salient for the invention can be applied also to a valve assembly in which the closing member 4 is moved rotatively. Such valves are named in practice also disk valves. The structure of the valve casing parts 1, 2, their connection by means of casing seal 12 and connecting means 13, the embedding of seal 7 with the sealing places 8 and 9, the groove in the seal 7b, the connection conduit 7a and the leakage cavity 6 in the way as illustrated are state of the art. The application of the features salient for the invention is shown by the arrangement of the locking piece 5. This comprises at least in the range of its coverage of the inlet of leakage cavity 6 a surface congruent to that of closing member 4 covering said range. In the embodiments according to FIGS. 70 and 71 it is firmly fixed to the closing member 4. Its first rotative travel, measured on the arc, amounts to a* and corresponds in this instance to an angle of 90°. FIG. 70 shows the closed position of the disk valve. Upon a rotary movement of the closing member 4 into the direction marked β there are successively exposed the sealing places 8 and 9. In the open position of the disk valve (FIG. 71), the locking piece 5 is located within seal 7 and so takes care of the locking of the inlets into the leakage cavity 6. The switching motion does not take place in a leakage-free manner.

A leakage-free switching embodiment of a disk valve with the fundamental structure according to FIG. 70 is shown in FIGS. 72 and 73. The locking piece 5 is disposed relatively movable in respect of the closing member 4 on the rotary axis 4a thereof. In the closed position of the disk valve (FIG. 72) the locking piece 5 is sealingly abutting closing member 4.

While on the way into the open position (FIG. 73) the closing member 4 travels at its circumference a first rotary path a*, measured on the arc, there is resulting for the locking piece 5 in the same context merely a second rotary path b*, measured on the arc. The switching action takes place leakage-free, since the locking piece 5 is constantly abutting sealingly closing member 4 during its opening motion. The disk valve is in its remaining structure identical to that according to FIG. 70; a detailed description is therefore superfluous.

In FIG. 74 are illustrated two sealing areas of a valve. In the lower part there is dealt with the sealing area of the closing member 4 in the cooperation with the seals 70 and 71, which are disposed in series and seal the inside spaces of the valve casing parts 1 and 2 against each other. The closing member 4 is in the shown illustration located in its closed position, wherein the overflow of fluids from one valve casing part 1 or 2 into the respective other one is prevented. The upper part FIG. 74 shows a seal assembly in the region of the passages of stems, wherein the seals 70 and 71, in contrast to the seal assembly in the area of the closing member, possess a relatively great distance from each other. While the seal 71 is here, analogously to seals 70 and 71, disposed in the area of the closing member 4 and seals an annular space 38 against the inside space of the valve casing part 1, the seal 70 is disposed in a casing closing part 3 and separates the above annular space 38 from the environs of the valve or from another space. Between the valve casing parts 1 and 2, or the valve casing part 1 and the casing closing part 3, respectively, there is placed a disk 37 concentrically enclosing both form- and power-closed the closing member 4, which dips into the into the annular space 38 between the seals 70, 71 (cf. also the enlarged illustration of this region in the FIGS. 75 and 76) and which with a separating wall 37a disposed in the region of the connection level of the valve casing parts 1 and 2, or 1 and 3, respectively, on the one side in combination with valve casing part 1 or 3 forms a first annular space 44 and with the valve casing part 2 or 1, respectively, on the other side forms a second annular space 45. The separating wall 37a leaves between itself and the closing member 4 a passage gap 38a for the connection of the annular spaces 44 and 45 with one another. The disk 37 is outwardly sealed against the valve casing parts 1 and 2 or 1 and 3, respectively, by means of a casing seal 12. The first annular space 44 is connected via a connection port 15 and the second annular space 45 via a drain outlet 2a connected to the environs of the valve. Between the relatively widely spaced seals 70, 71 of the upper sealing area there is provided in the part of annular space 38 connected with connection port 15 a deflection piece or baffle 39, which on the one side forms a conduit 39a between itself and the casing closing part 3, which conduit extends from the first annular space 44 to the seal 70, and on the other side provides a connection between itself and valve part 4 from seal 70 to the penetration gap 38a. The deflector 39 can either be disposed material-closed or shaped on the separating wall 37a.

From the enlarged illustration of FIGS. 75 and 76 there are clearly evident the advantageous details discussed in the following. Seals 70 and 71 (cf. FIG. 75) and seal 71 (cf. FIG. 76) are bordered on their side facing the inside space of the valve casing parts 1 or 2 to be sealed off by a liquid-permeable boundary wall 41. Between seals 70 or 71 and disk 37 there is provided an axial tolerance, so that the respective seal can move restrictedly, either as a consequence of the motion of closing member 4 or owing to forces of pressure from the inside space of the valve casing parts 1 or 2, as seen from axial direction. Upon the abutment of seal 70 or 71 at the disk 37 it is, however, in each case ensured that between the annular spaces 44 and 45 on both sides of the separating wall 37a there exists an open conduit 38a through the separating wall 37a. By means of a first and a second recess 42 and 43, disposed at valve casing parts 1 or 2, the latter may be centered in respect of each other via the disk 37. The separating wall 37a is expediently disposed asymmetrically within the disk 37, so that the passage cross-section of the second annular space 45 is larger than that of the first annular space 44.

The inlet of the cleansing fluid into the connection port 15 is designated with I. During a cleaning of the sealing area in the region of the valve seat (cf. FIG. 75), the cleansing fluid passes through the first annular space 44 into the partial space of annular space 38 formed between the seal 70 and the separating wall 37a. There it can flush the seal 70 up to its contact surfaces on the one side with the valve casing part 1 and on the other side with the closing member 4. Through the penetration gap 38a the cleansing fluid reaches the other side of the separating wall 37a to flood in the same manner the seal 71. The cleansing fluid leaves the valve casing part 2 through the second annular space 45 and the drain outlet 2a, the outlet of the cleansing fluid being designated with II. By the different dimensioning of annular spaces 44 and 45, as explained above, there is prevented a pressure build-up in the region of the annular space 38. The cleaning of seals 70 and 71 on their sides facing the inside spaces of valve casing parts 1 and 2 to be sealed off is effected by means of a jet of cleansing fluid III which is capable of penetrating the boundary wall 41 and then flush the seal from this side. For cleaning the casing seal 12 in the region of disk 37, there is expediently provided a first bypass conduit 37b (cf. FIG. 77), which interconnects the annular spaces 44 and 45 and is tangent to seal 12. When such a first bypass conduit 37b is used, the cleansing fluid entering through the inlet I separates into two partial streams of different size, designated in FIG. 77 with III, wherein the greater part passes into the annular space 38 between the seals 70 and 71. Any possibly occurring leakage at the seals 70 or 71 is expediently drained through the second annular space 45, which has the greater passage cross-section, and the drain outlet 2a.

The structure of the disk 37 in the region of the stem seal 70, 71 (cf. FIG. 76) is identical to that of the disk 37 according to FIGS. 75 or 77. The sole difference resides in that the cleansing fluid conducted through the first annular space 44 is advanced through the conduit 39 to seal 70 to come from there, guided by the first deflection piece 39, after passing through the penetration gap 38a, to the seal 71. The discharge of the cleansing fluid or the leakage, respectively, is effected in the same manner is in the assembly according to FIG. 75.

In FIGS. 78 to 81 there is shown another embodiment of an apparatus for cleaning a dynamically loaded seal assembly of a valve, wherein the essential difference over the embodiment according to FIGS. 74 to 77 resides in that the bordering surfaces of valve casing parts 1 and 2, or 1 and 3, respectively, are on the joint level of connection, are conducted into the annular space 38 up to near the seals 70 and 71 and there are sealed against each other by means of the casing seal 12. The separating wall 37a of the disk 37 separating the annular spaces 44 and 45 from one another according to the embodiment shown in FIG. 74 is now replaced by separating walls not designated in detail, which are either disposed material-closed or shaped on the valve casing parts 1 and 2 or the casing closing part 3. Owing to this the casing seal 12 can be moved to the direct range of the seals 70 and 71. A retaining ring 46 supports on the one side the casing seal 12 on the valve part side and on the other side forms between itself and the valve part 4 the penetration gap 38a. On the side of the retaining ring 46 facing the seals 70 or 71 there is disposed a liquid-permeable first or second spacer 46a or 46 b, respectively, which upon contact with the respective adjacent seal 70 or 71 ensures a passage cross-section between the retaining ring 46 and the respective seal. Between the retaining ring 46 and the casing seal 12 there can be disposed a second bypass conduit 47 within the retaining ring 46 for intensifying the cleaning effect and connecting the partial spaces of the annular space 38 with each other (cf. in particular the enlarged illustration according to FIG. 81). In the region of the stem seal (cf. FIG. 80) the retaining ring 46 is disposed material-closed or shaped on a second deflection part 40.

The remaining structure of the seal assembly according to FIGS. 78 to 81, FIGS. 79 to 81 showing enlarged illustrations of essential parts of the embodiment, is identical to that according to FIG. 74. For identical or similar structural parts having identical or similar functions there were used the same terms. A more extensive description of the embodiment is therefore superfluous.

When fluid under pressure is present in the inside spaces of valve casing parts 1 or 2, the seal 70 or 71 concerned will possible become displaced towards the annular space 38. After overcoming the axial tolerance between the seal and the retaining ring 46 it will come to abut at the latter and possibly displace same towards the other seal until an abutment is formed also at that seal. Now, the one seal is supporting itself at the other seal by means of the retaining ring 46, while, as already mentioned above, a passage between the annular spaces 44 or 45, respectively, and the penetration gap 38a is ensured at all times by spacers 46a or 46b, respectively. The displacement of the retaining ring 46 has the additional effect that always another contact surface at the casing seal 12 will form the abutment and thus there are provided favourable conditions in this region in aspects of cleaning technique. The same favourable conditions for the cleaning are created, as explained already above, for the contact surfaces of seals 70 and 71 by their axial mobility.

When the seals 70 and 71, as is proposed according to the invention, are shaped twisted in themselves by 360° in such a manner that all feasible fibers enclosing the torus axis are of equal length, a sliding and/or a twisting of the seal owing to the movement of valve part 4 is facilitated per se. Thereby there is achieved a favourable sitation in aspects of cleaning technique in that as consequence of the movement of valve part 4 there is permitted and also achieved the formation of a constantly varying other contact surface of seal 70 or 71 at the same sealing place 8 or 9 or the same or another contact surface of the seal at another sealing place.

What is claimed is:

1. A process for controlling a leakage cavity of a valve having a valve casing defining a first interior volume and a second interior volume, the valve being provided with a closing member, two sealing places disposed in series on the valve casing and a leakage cavity disposed between the sealing places and connected to the interior volumes of the valve casing via a connection and to the outside of the valve via a flow passage in the valve casing, the sealing places cooperating with the closing member (1) to prevent the flow of fluid between the first interior volume and the second interior volume and (2) to completely close off the connection of the leakage cavity to the interior volumes of the valve casing in a closed position of the valve, comprising:

controlling the connection between the leakage cavity and the interior volumes of the valve casing in positions other than the closed position of the valve, when the first and second interior volumes are in fluid communication with one another, by placing another element in cooperation with the two sealing places to close the connection between the leakage cavity and the interior volumes of the valve casing when the valve is in positions other than the closed position.

2. A process according to claim 1, characterized in that the connection between the leakage cavity and the interior volumes can be controlled in the open position and during the opening or closing movement, respectively, of the valve.

3. A process according to claim 1, characterized in that the connection between the leakage cavity and the interior volumes can be controlled in the open position of the valve.

4. A valve comprising:
a valve casing defining a first interior volume and a second interior volume;
two sealing places disposed in series on the valve casing between said first interior volume and said second interior volume;

a leakage cavity disposed between the sealing places, said leakage cavity being connected to the interior volumes of the valve casing via a connection and to the outside of the valve via a flow passage in the valve casing;

a closing member movable between a closed position in which said closing member cooperates with said two sealing places to prevent flow of fluid between said first interior volume and said second interior volume, as well as the flow of fluid between said leakage cavity and said interior volumes, and an open position in which said closing member permits the flow of fluid between the first interior volume and the second interior volume; and a shutter member defining a flow passage and, when said closing member is in said open position, cooperating with said sealing places to prevent the flow of fluid between the leakage cavity and the interior volumes of the valve casing, said flow passage placing said first and second interior volumes in fluid communication with one another when said shutter member cooperates with said sealing places.

5. An apparatus according to claim 4, characterized in that in the closed position of the valve the closing member (4) is positioned so that only one of the sealing places (8 or 9) is between the valve casing (1, 2) and the closing member (4), and in that via the sealing place (8 or 9) becoming exposed by a partial lift of the closing member (4), the leakage cavity (6) is connected to the one of said first and second interior volumes (2 or 1, respectively) adjacent to the exposed sealing place (8 or 9).

6. An apparatus according to claim 5, characterized in that in the open position of the valve the shutter member (5) is positioned so that only one of the sealing places (8 or 9) is between the valve casing (1, 2) and the shutter member (5), and in that via the sealing place (8 or 9) becoming exposed by the partial lift of the shutter member (5), the connection of the leakage cavity (6) to the inside space (1 and 2) is open.

7. An apparatus according to claim 4, characterized in that in the closed position of the valve the closing member (4) and the shutter member (5) are spaced from one another, forming a circular gap (19).

8. An apparatus according to claim 4, characterized in that a first stem (5a) is connected to a drive piston (5g), which is sealingly conducted within the closing member (4) and defines with the closing member a drive chamber (4g) which via a second stem (4a) communicates with a pressure medium connection (48).

9. An apparatus according to claim 4, characterized in that the shutter member (5) has at least in the region of its coverage of the leakage cavity (6) a shape congruent to the surface of the closing member (4) covering said region.

10. An apparatus according to claim 9, characterized in that the shutter member (5) is configured as a cylindrical annular body which has, opposite to the sealing places (8,9), the shape and the dimensions of the closing member (4).

11. An apparatus according to claim 10, characterized in that the shutter member (5) comprises a passage opening (5c) having a cross-section corresponding to the nominal cross-section of the valve.

12. An apparatus according to claim 4, characterized in that at least on the side of said closing member (4) averted from the direction of the opening movement of said closing member there is disposed a cylindrical first compensating piston (21) the diameter (D) of which is as equal to diameter (D) of said closing member (4) as possible, and in that the closing member (4) and the compensating piston (21) are connected to each other via a connecting piece (23) the diameter (d) of which is smaller than the diameter (D) of either the closing member (4) or the compensating piston (21).

13. An apparatus according to claim 12, characterized in that there is provided at least one connecting piece (23), and a centric area around the axis of symmetry of the first compensating piston (21) and the closing member (4) which is clear of the connecting piece.

14. An apparatus according to claim 13, characterized in that the shutter member (5) has a stem disposed in the centric area around the axis of symmetry of the first compensating piston (21) and the closing member (4).

15. An apparatus according to claim 14, characterized in that the stem (5a) is connected to the exterior of the valve casing indirectly via a connecting traverse (24) and an actuating rod (25) extending through the closing member (4), the connecting piece (23), and the first compensating piston (21).

16. An apparatus according to claim 14, characterized in that the stem (5a) extends out of the valve casing directly through the first compensating piston (21).

17. An apparatus according to claim 12, characterized in that a second compensating piston (22) is provided which directly follows closing member (4) and has a diameter as equal as possible to the closing member diameter.

18. An apparatus according to claim 12, wherein the shutter member has a stem extending into one of the closing member and the first compensating piston at a first penetration site, and the apparatus further comprises means for closing off the penetration site from the interior of the valve casing, the closing off means comprising a bellows.

19. An apparatus according to claim 12, wherein the first compensating piston extends through the valve casing at a penetration site, and the apparatus further comprises means for closing off the penetration site from the interior of the valve casing, said closing off means comprising a bellows.

20. An apparatus according to claim 19, further comprising a second compensating piston directly following the closing member and penetrating the valve casing at another penetration site, and means for closing off said other penetration site from the interior of the valve casing, said other penetration site closing off means comprising a bellows.

21. An apparatus according to claim 4, wherein said shutter member has a stem and elements connecting said stem to said shutter member.

22. An apparatus according to claim 21, wherein said closing member has a stem, and said shutter member stem is journaled either on or in said closing member stem.

23. An apparatus according to claim 4, wherein said sealing places comprise sealing means disposed either (1) on the valve casing, or (2) on the closing member and the shutter member.

24. An apparatus according to claim 23, characterized in that between the sealing places (8, 9) there is provided a circular groove (2b or 7b, respectively) open towards the interior of the valve casing (1, 2), which is connected to the outside of the valve on the side of the valve casing via at least one conduit.

25. An apparatus according to claim 23, characterized in that the sealing places (8, 9) are realized by two separate seals (70, 71).

26. An apparatus according to claim 23, characterized in that the sealing places (8, 9) are realized by a one-piece seal (7).

27. An apparatus according to claim 4, characterized in that the shutter member is arranged to move with the closing member through a limited range of movement, and in that a stop is provided on the shutter member which limits the movement of the shutter member beyond a region of the valve having said two sealing places.

28. An apparatus according to claim 4, characterized in that the shutter member has a stem, and the closing member has a stem extending through the stem of the shutter member at a penetration site, and the apparatus further comprises means for closing off the penetration site from the interior of the valve casing, the closing off means comprising a bellows.

29. An apparatus according to claim 4, characterized in that one of the shutter member and the closing member has a stem extending through the valve casing at a penetration site, and the apparatus further comprises means for closing off the penetration site from the interior of the valve casing, said closing off means comprising a bellows.

30. An apparatus according to claim 4, wherein said closing member is a structurally slide-like closing member, and said shutter member is firmly fixed to said closing member.

31. An apparatus according to claim 30, characterized in that, in a closed position of the valve, the closing member (4) is positioned so that only one of the sealing places (8 or 9) is between the valve casing (1, 2) and the closing member (4) and in that via said only one sealing place (8 or 9) becoming exposed by the partial lift of closing member (4), the leakage cavity (6) is connected to the interior volume (2 or 1, respectively) adjacent to the exposed sealing place (8 or 9).

32. An apparatus according to claim 30, characterized in that, in the open position of the valve, the shutter member (5) is positioned so that only one of the sealing places (8 or 9) is between the valve casing (1, 2) and the shutter member (5), and in that, via the sealing place (8 or 9) becoming exposed by the partial lift of the shutter member (5), the leakage cavity (6) is connected to the interior volumes (1 and 2).

33. An apparatus according to claim 30, characterized in that the shutter member has at least in the region of its coverage of the leakage cavity (6) a shape congruent to the surface of closing member (4) covering said region.

34. An apparatus according to claim 33, characterized in that the shutter member (5) is configured as a cylindrical annular body which has in respect of the sealing places (8, 9) the appropriate shape and the dimensions of closing member (4).

35. An apparatus according to claim 34, characterized in that the shutter member (5) is firmly connected to closing member (4) at a distance (a, a*), and in that the utilizable cross-section of apertures (4b) between the closing member (4) and the shutter member (5) corresponds to the nominal cross-section of the valve.

36. An apparatus according to claim 34, characterized in that the shutter member (5) comprises a passage opening (5c) which has a cross-section corresponding to the nominal cross-section of the valve.

37. An apparatus according to claim 30, characterized in that during the motion of the closing member (4) from its closed into its open position or vice versa, the connection (5c, 7b, 7a, 6 or 5c, 6, respectively) temporarily existing between the interior volumes (1, 2) and the leakage cavity (6) is closed by locking means actuated either directly or indirectly by the motion of closing member (4).

38. An apparatus according to claim 37, characterized in that the locking means are disposed on the side of the casing in relation to the sealing places (8, 9).

39. An apparatus according to claim 37, characterized in that the locking means are disposed on the side of the closing member and lock the openings (4b) between closing member (4) and locking piece (5).

40. An apparatus according to claim 30, characterized in that during the motion of the closing member (4) from its closed into its open position or vice versa, the outlet opening (2a) or the main drain (18) are closed by controllable locking means either directly or indirectly actuatable by the closing member (4).

41. An apparatus according to claim 30, characterized in that between the sealing places (8, 9), a conduit (16) and a second conduit (16a) which are each connected with the environs of the valve via a connection port (15 or 15a, respectively) both discharge side by side but separately from each other into the interior volumes of the valve casing parts (1, 2), in that the closing member (4) has a circular groove (4d) which, with reference to its closed position, is located between the sealing places (8, 9) and is disrupted in the region between the mouths of the conduit (16) and the second conduit (16a) in such a manner that the one end of groove (4d) is directly connected only with the conduit (16) and the other one only with the second conduit (16a), in that the shutter member (5) has a groove (5e), the ends of which in the open position of the valve, connect in the same manner as with closing member (4) the mouth of the conduit (16) and that of the second conduit (16a), and in that in the direction of the switch travel of the closing member (4) between the respective corresponding ends of the grooves (4d or 5e, respectively) there is provided a control ridge (5f) equal in height to the jacket surfaces of the closing member (4) and of the shutter member (5), which sealingly closes the mouth of the conduit (16) and that of the second conduit (16a) during the switch travel.

42. An apparatus according to claim 30, characterized in that the closing member has a stem extending through the valve casing at a penetration site, and in that the apparatus further comprises means for closing off the penetration site from the interior of the valve casing, said closing off means comprising a bellows.

43. An apparatus according to claim 4, characterized in that the valve casing has a first valve casing portion and a second valve casing portion connected to one another at a connection, a casing seal positioned between said first and said second casing portions at the valve casing connection, a conduit defined by the valve casing at the level of the connection between the valve casing portions, the conduit being connected on one side to the outside of the valve via at least one connection port and, on the other side, to the leakage cavity via a discharge mouth, and a main drain connected to the outside of the valve via a discharge opening and connected to the leakage cavity.

44. An apparatus according to claim 43, characterized in that the conduit (16) extends over nearly the entire circumference of the leakage cavity (6), and in that the main drain (18, 18a) is connected to a region of the leakage cavity (6) which is not bounded by conduit (16).

45. An apparatus according to claim 43, characterized in that the discharge mouth (17) is shaped either as circular ring gap or as more than a discrete geometrically defined opening, or as a plurality of geometrically undefined openings.

46. An apparatus according to claim 43, characterized in that there are a plurality of discharge mouths (17) disposed in such a manner that they are partly bounded by the sealing places.

47. An apparatus according to claim 45, characterized in that the sealing places comprise seals each having a circular cross-section, in that the sealing place seals are bounded on the side facing the respective interior volumes to be sealed off (1 or 2, respectively) by a liquid permeable boundary wall (41), in that each of the sealing place seals (70, 71) has in the direction of the motion of the closing member (4) a limited mobility, and in that the sealing place seals (70, 71) can be supplied with cleansing fluid either simultaneously or successively from an annular space (38) through a connection opening, which fluid is drained through the discharge mouth (2a).

48. An apparatus according to claim 47, characterized in that between the valve casing portions a disk (37) is disposed which extends into the annular space (38) between the seals (70, 71) and forms with a separating wall (37a) disposed in the region of the level of the connection of the valve casing portions, on the one side, in combination with one valve casing portion (1 or 3, respectively) a first annular space (44) and with another valve casing portion (2 or 1, respectively) on the other side a second annular space (45), the separating wall (37a) leaving a penetration gap (38a) free in the region of the closing member (4) for the connection of the annular spaces (44 and 45) with each other, in that the casing seal (12) outside of the disk (37) sealingly connects the valve casing portions (1 and 2 or 3, respectively), and in that the first annular space (44) comprises at least one connection port (15) and the second annular space (45) comprises at least one discharge mouth (2a).

49. An apparatus according to claim 48, characterized in that the separating wall (37a) is asymmetrically disposed within the disk (37) in such a manner, that the cross-sectional area of the second annular space (45) is greater than that of the first annular space (44).

50. An apparatus according to claim 48, characterized in that the annular spaces (44, 45) are connected to each other via a first bypass conduit (37b) which is tangent to the casing seal (12).

51. An apparatus according to claim 47, characterized in that the boundary surfaces of the valve casing portions (1 and 2 or 3, respectively) lie on the joint connection plane, extend into the annular space (38) up to close to the seals (70, 71) and are sealed there against each other by means of the casing seal (12), in that a retaining ring (46) on the one side supports the casing seal (12) on the side of the casing seal facing the interior volumes, and on the other side leaves open a penetration gap (38a) between itself and the closing member (4), thus interconnecting partial spaces of the annular space (38) formed by the retaining ring (46), and in that each of a first spacer and a second spacer (46a or 46b, respectively) is disposed on the retaining ring (46) and extends into a respective one of said partial spaces, and in that the partial spaces of annular space (38) are connected, within a respective associated valve casing portion (1, 2, 3), with the connection opening (15) or with the discharge mouth (2a), respectively.

52. An apparatus according to claim 51, characterized in that the retaining ring (46) forms between itself and the casing seal (12) a second bypass conduit (47) which connects the partial spaces of the annular space (38) with each other.

53. An apparatus according to claim 51, characterized in that the retaining ring (46) has an axial extent which is equal to or smaller than a clear space between the casing seal (12) and the boundary wall (41).

54. An apparatus according to claim 48, characterized in that there is a relatively large distance between the seals (70, 71), there is provided a deflection part (39, 40) in a part of the annular space (38) which is connected with the connection port (15), which deflection part on the one side forms between itself and the casing closing part (3) a conduit (39a) from the first annular space (44) to the seal (70) and on the other side establishes a connection between itself and the valve part (4) from the seal (70) to the penetration gap (38a).

55. An apparatus according to claim 54, characterized in that the deflection part (39 or 40, respectively) is disposed on or moulded onto either the separating wall (37a) or the retaining ring (46).

56. An apparatus according to claim 48, characterized in that at least one of the first and second annular spaces (44 or 45, respectively) is connected via a conduit passing through the associated inner volume of the valve casing (1, 2) with its connection port (15) or its outlet opening (2a), respectively.

57. An apparatus according to claim 47, characterized in that each of the seals (70 or 71, respectively) is shaped twisted in itself by 360° in such a manner that all feasible fibers enclosing the torus axis of the seal are of equal lengths.

58. An apparatus according to claim 43, characterized in that there are a plurality of discharge mouths (17) so directed or designed, respectively, that a swirling velocity component is imparted to fluid streaming through them.

59. An apparatus according to claim 30, characterized in that at least on the side of closing member (4) averted from the direction of the opening movement there is disposed a cylindrical first compensating piston (21) the diameter (D) of which is as equal to diameter (D) of closing member (4) as possible, and in that the closing member (4) and the compensating piston (21) are connected to each other via a connecting piece (23) the diameter (d) of which is smaller than the diameter (D) of either the closing member (4) or the compensating piston (21).

60. An apparatus according to claim 59, characterized in that a second compensating piston (22) is provided which directly follows closing member (4) and has a diameter as equal as possible.

61. An apparatus according to claim 59, characterized in that a second bellows (27) bridges material-closed a second penetration site (30) between the first compensating piston (21) and the valve casing (1 or 2, respectively).

62. An apparatus according to claim 61, characterized in that a third bellows (28) bridges material-closed a third penetration site (31) between the second compensating piston (22) and the valve casing (2 or 1, respectively).

63. The apparatus of claim 4, wherein said closing member is translatorily displaceable.

* * * * *